United States Patent
Fifield et al.

(10) Patent No.: US 6,869,018 B2
(45) Date of Patent: Mar. 22, 2005

(54) TRANSCRIPT MANAGEMENT SOFTWARE AND METHODS THEREFOR

(75) Inventors: Davin J. Fifield, Denver, CO (US); Kevin S. Koch, Denver, CO (US)

(73) Assignee: RealLegal, LLC, Aurora, CO (US)

( * ) Notice: Subject to any disclaimer, the term of this patent is extended or adjusted under 35 U.S.C. 154(b) by 384 days.

(21) Appl. No.: 09/920,443

(22) Filed: Jul. 31, 2001

(65) Prior Publication Data

US 2002/0124018 A1 Sep. 5, 2002

Related U.S. Application Data

(60) Provisional application No. 60/221,804, filed on Jul. 31, 2000.

(51) Int. Cl.$^7$ .............................................. G06K 19/00
(52) U.S. Cl. ...................... 235/487; 345/700; 345/751; 715/511; 715/512
(58) Field of Search .......................... 235/487; 345/751, 345/700; 715/511, 512, 517; 395/772; 707/511

(56) References Cited

U.S. PATENT DOCUMENTS

| | | | | |
|---|---|---|---|---|
| 5,146,552 A | * | 9/1992 | Cassorla et al. | 715/512 |
| 5,537,526 A | * | 7/1996 | Anderson et al. | 715/515 |
| 5,671,428 A | * | 9/1997 | Muranaga et al. | 345/751 |
| 5,890,176 A | * | 3/1999 | Kish et al. | 715/511 |
| 6,065,026 A | * | 5/2000 | Cornelia et al. | 715/531 |
| 6,091,835 A | | 7/2000 | Smithies et al. | 382/115 |
| 6,282,510 B1 | | 8/2001 | Bennett et al. | 704/235 |

* cited by examiner

Primary Examiner—Diane I. Lee
Assistant Examiner—Lisa M. Caputo
(74) Attorney, Agent, or Firm—Holland & Hart LLP

(57) ABSTRACT

A method for transferring annotations associated with a draft electronic transcript to a revised electronic transcript, the method determines if the revised electronic transcript is derived from the draft electronic transcript, and if so, creates annotations in the revised electronic transcript based on the annotations associated with the draft electronic transcript.

11 Claims, 32 Drawing Sheets e-transcript Binder-[d:\binder\binderproject\reallegal3.pxl]

File Edit View Transcripts Annotations Tools Window Help c:\binder\binderproject\reallegal3.dir
- All Annotations
- All Issues — 38
- Reports
- Search Groups
- Transcripts
  - c090597a — 26
  - flint
  - k022497
  - Real Time Issue
(Default issue) ⎫
Negligence    ⎬ 39
Omission      ⎭

Active | Quickmark
☑ | ⦿
☑ | ○
☑ | ○

25

[Default Issue]
Negligence
Omission

36 testimony

A aahmer
Transcripts
3,7
ab
Transcripts
5,2
abatement
Transcripts
13:11 27:22
abide
Transcripts Page 1[12]

Transcript
4    "QUESTION: Okay."
5    "ANSWER: And answering your original question,
6    without reviewing the document, I don't know why."
7    "QUESTION: As you understand the procedure, would
8    it typically occur that a supervisor in front-end collections
9    would have an account come across her screen that's older than
10   90 days?"
11   "ANSWER: We don't know what the delinquency level
12   of the account was in May of '95."
13   "QUESTION: If indeed the delinquency level, as you
14   referred to it, was greater than 90 days, according to service

FIG. 4

Edit Annotation

Comment

Reference to negligence

OK
Cancel
Apply
Delete
<< 0 >>
Location
Send to: JFS

Chronology
☑ Enable Chronology
06/27/2000    Set Default

Attachment
View
Paste Notes Links

Issues
Negligence
Select

Created by: Sunny

```
┌─ e-transcript Binder-[d:\binder\binderproject\reallegal3.pxl]                    ┌□□⊠
  File Edit View Transcripts Annotations Tools Window Help
  ┌──────────────────────────────────────────────────────────────────────────────┐
  │ ┃ ┃ ┃ | ┃ ┃ | ┃ ┃ ┃ | ┃ ┃ | ┃ ┃ |  100%        ▽ | ┃ ┃ ┃ | ┃                │
  ├──────────────────────────────────┬──────────────────────────────────────────┤
  │ ⊟─ c:\binder\binderproject\reallegal3.dir △ │Transcript Section │Type │Locat..▽│
  │      All Annotations              │ ▤ Appearances     Heading 1:08           │
  │      All Issues                   │ ▤ Index           Heading 2:02           │
  │      Reports                      │ ▤ Proceedings     Heading 3:01           │
  │   ⊞── Search Groups               │                                          │
  │   ⊟── Transcripts                 │                                          │
  │       ⊞─ c090597a                 │                    ↖                     │
  │       ⊞─ flint                    │                     30                   │
  │       ⊟─ k022497                  │                                          │
  │          Real Time                │                                          │
  │          Real Time                │                                          │
  │          Real Time                │                                          │
  │       ⊟── Transcript One          │                                          │
  │          ▤ Appearances            │                                          │
  │          ▤ Index                  │                                          │
  │          ▤ Proceedings         ▽  │                                          │
  ├───────────────────────────────────┼──────────────────────────────────────────┤
  │Transcript One-Appearances Page 1[49]│testimony                              ▽│
  │ 1     REPORTER'S RECORD       △│                    A                    △ │
  │ 2        VOLUME 1 OF 1         │ aahmer                                     │
  │ 3     Trial Court Cause No. 97 │ Transcripts                                │
  │ 4 RAY GREEN and JESSE GREEN, *IN│ 3.7              40                      │
  │     Plaintiffs              *  │ ab                                         │
  │ 5                              │ Transcripts                                │
  │   vs.                     * CC │ 5.21 ┌Transcript Two─────────────────────┐│
  │ 6                         *    │ abate│This claim alone probably prevented United Republic from being│
  │    JAMES W. PARKER,       *    │ Trans│successfully rehabilitate and redomesticated.│
  │ 7  Defendant              * DA │ 13:11│   If we're correct in these things and the│
  │                                │ abide│transaction with United Overseas Bank was void ab initio or subject│
  │ 8                              │ Trans│to the defenses which we've alleged in our most recent pleadings,│
  │    APPEARANCES:                │ 124: │then United Overseas Bank (Luxembourg) should not be allowed│
  │ 9                              │ability│to exercise its rights under the loan security agreement.│
  │       Attorney for Plaintiffs: │ Trans└───────────────────────────────────┘│
  │10     MR. RAY E. GREEN         │ 25:17 144:25 145:4 129:17 141:9 6:16       │
  │       MR. JESSE GREEN          │ able                                       │
  │                              ▽ │ Transcripts                                │
  │                                │ 22:21 26:8,8.17 14:10 204:25 207:20 210:19 211:14,21 56:3│
  │ ◁                           ▷  │ 74:9 104:22 117:5 123:20 130:9 131:21 135:23 162:18  ▽│
  └───────────────────────────────────┴──────────────────────────────────────────┘
                                                          QUICK PREVIEW
                         FIG.7                              PANE 43
```

```
e-transcript Binder-[d:\binder\binderproject\reallegal3.pxl]
File Edit View Transcripts Annotations Tools Window Help
```

| c:\binder\binderproject\reallegal3.dir | Transcript Section | Type | Location |
|---|---|---|---|
| All Annotations | Statement of Facts | Heading | 1:10 |
| All Issues | Appearances | Heading | 2:01 |
| Reports | Proceedings | Heading | 3:01 |
| Search Groups | | | |
| Expert Witnesses | | | |
| Project Group | | | |
| Transcripts | | | |
| c090597a | | | |
| flint | | | |
| k022497 | | | |
| Real Time | | | |
| Real Time | | | |
| Transcript One | | | |
| Transcript Three | | | |
| Transcript Two | | | |

↙ 30

Transcript Two-Proceedings    Pages 16-17(28)

```
20 irreparable injury--merely generalizations.
21        We had the Deputy Liquidator for the state
22 Utah, Commissioner of Insurance, that was here. They h
23 3:00 o'clock flight and had to go back. But the questions
24 they would have given and that the reason they were her
25 because the State of Utah believes that--that they ha 1 seen the pleadings that were filed in this case. And t
2 believe there were so many inaccuracies what they wante
3 set the record straight. As this matter continues, the
4 probably will be an opportunity to do that.
5        But certainly the Proof of Claim filed by
``` testimony testimony
bond
probate
able
molest                    42
impropriety
misrepresentation
error
culpability
calculation NEAR motion

FIG.8 hash=0
multiple=BIG_NUMBER for each character in a string (non-whitespace)

hash=hash+(multiple* (character position 1-N)*(asci value of character))
multiple=multiple*BIG_NUMBER end for

FIG.14B

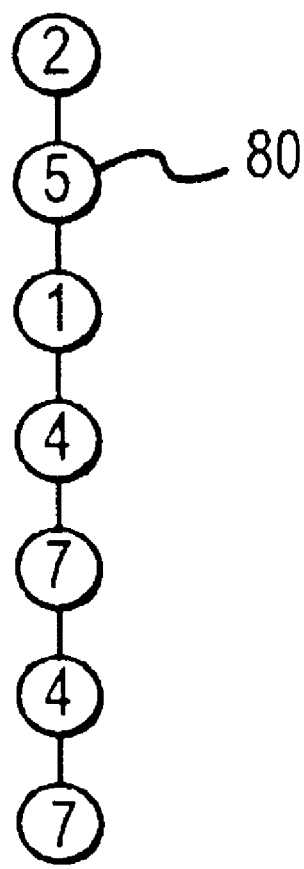
FIG.17A

O = ENTRY WITH
(HASH OF WORD)(PAGE#)(LINE#)(START POSITION OF WORD)(END POSITION OF WORD)

155
ORIGINAL TRANSCRIPT
DATA

156

<PAGE BREAK CHARACTER>

157

15703 <LINE BREAK CHAR>
158 — SUZANNE MCDONELL-DIRECT <LINE BREAK CHAR>
159 { 1. Q. I WANT TO SHOW YOU WHAT'S BEEN MARKED AS <LINE BREAK CHAR>
2. DEFENSE EXHIBIT M95. DO YOU RECOGNIZE THAT? <LINE BREAK CHAR>
3. A. YES, I DO. <LINE BREAK CHAR>

TRANSCRIPT MANAGEMENT SOFTWARE AND METHODS THEREFOR

CROSS-REFERENCE TO RELATED APPLICATION

This application claims priority under 35 U.S.C. 119(e) from U.S. provisional patent application Ser. No. 60/221,804, entitled "TRANSCRIPT MANAGEMENT SOFTWARE AND METHODS THEREFOR," filed Jul. 31, 2000, the disclosure of which is hereby expressly incorporated by reference herein.

FIELD OF THE INVENTION

This application relates, in general, to transcript management software and methods therefore.

BACKGROUND OF THE INVENTION

Legal transcripts are used to memorialize the events which occur in a deposition or courtroom proceeding or the like. After a transcript has been taken of a deposition or court proceeding, a court reporter provides a version of the transcript, either a draft version or a final version, to attorneys, courts, witnesses, or other parties interested in the transcript. A draft or "dirty" or non-final version of a transcript typically has words which are later changed or corrected by the court reporter or by the witness prior to the issuance of a final, clean version of the transcript. Spelling errors, abbreviations, phonetic spellings, are a few examples of the items which are corrected prior to issuance of a final clean transcript. Conventionally, the attorney or paralegal reviews the transcript, such as the draft transcript, and highlights text within the transcript of interest, or makes notes regarding portions of text within the transcript.

As recognized by the present inventors, with the advent of electronic transcripts, there is a need for transferring electronic annotations that are associated with a draft of a transcript so that the annotations are properly associated with a final version of the transcript, so that the annotations can be readily used when referencing the final version of the transcript. Further as recognized by the present inventors, there is a need for analyzing the structure of a selected transcript in order to automatically identify the different sections within a transcript, such as the question and answer pairs, a change of witnesses, a direct examination, a cross-examination, reference to an exhibit, etc.

It is against this background that the various embodiments of the present invention were developed.

SUMMARY OF THE INVENTION

In light of the above and according to one broad aspect of one embodiment of the invention, disclosed herein is a method for transferring annotations associated with a draft electronic transcript to a revised electronic transcript. The method determines if the revised electronic transcript is derived from the draft electronic transcript, and if so, creates annotations in the revised electronic transcript based on the annotations associated with the draft electronic transcript.

The foregoing and other features, utilities and advantages of the invention will be apparent from the following more particular description of various embodiments of the invention as illustrated in the accompanying drawings and claims.

BRIEF DESCRIPTION OF THE DRAWINGS

FIG. 4 illustrates an example of a screen display showing an annotation in the transcript pane of the display relating to the "default issue" in accordance with one embodiment of the present invention.

FIG. 5 illustrates an example of a screen display with a comment which can be associated with a particular annotation in accordance with one embodiment of the present invention.

FIG. 6 illustrates an example of a screen display wherein the display pane has annotations, issue codes, and comments associated therewith.

FIG. 7 illustrates an example of a screen display with a quick preview pane associated with the word index, in accordance with one embodiment of the present invention.

FIG. 8 illustrates an example of a screen display with a pull down search menu, in accordance with one embodiment of the present invention.

FIGS. 17A–D illustrate examples of line and word lists of a draft and final transcript as they are linked using the operations of FIG. 16, in accordance with one embodiment of the present invention.

FIGS. 22-B illustrate an example of analyzing transcript data into lexical units in accordance with one embodiment of the present invention.

DETAILED DESCRIPTION OF THE PREFERRED EMBODIMENTS

In accordance with the various embodiments of the present invention, a method and computer program product for organizing, annotating, reporting, and managing electronic transcripts is disclosed herein. In particular, methods for automatically analyzing the structural components of an electronic transcript are disclosed herein, as well as methods for transferring annotations associated with a draft electronic transcript to a revised or final electronic transcript for use therewith is also disclosed herein. Other features and functions of various embodiments of the present invention are also disclosed herein.

Figure 1:
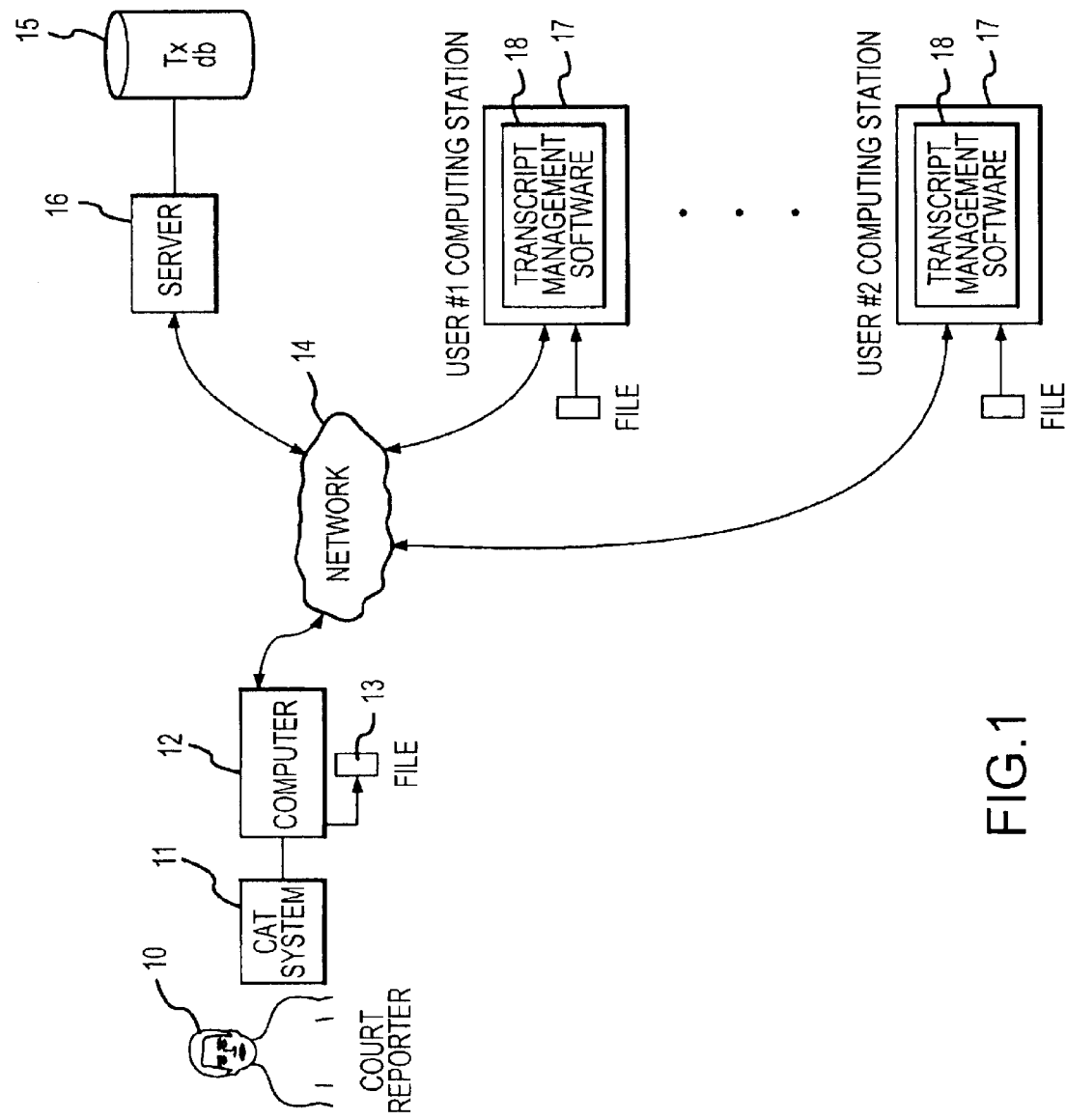
FIG. 1 illustrates a block diagram in accordance with one embodiment of the present invention.

FIG. 1 illustrates a block diagram of one embodiment of the present invention. As shown in FIG. 1, a court reporter records the events and words spoken during a deposition, court proceeding, or the like, using, for example, a CAT (computer-aided transcription) system coupled to a computer. The resulting transcript of the proceeding is stored in a file which can be persistently stored on a removable media such as a floppy disk, CDRom, or the like, or transferred over a network or a serial link to a user such as a court, a judge, a lawyer, a law firm, a witness, etc. In one example, the transcript file is stored in a transcript database having a server coupled thereto, which makes the electronic transcript available for access by others over a network.

In accordance with embodiments of the present invention, one or more user computing stations are provided with transcript management software which permits multiple users to access one or more electronic transcripts. The transcript management software permits a user to organize, annotate, search, and manage a plurality of transcripts. Multiple users can access a given transcript and perform various functions on a transcript, in that the transcript is a document sharable by multiple users.

In one example, the electronic transcript generated by the court reporter and accessible by one or more users in the computing system is a draft or final transcript. A draft or "dirty" transcript generally is a non-final version of the transcript and can be a complete transcript stored as a complete file, or alternatively, can be comprised of real time data being received by one or more users having the transcript management software of the present invention.

A final or "clean" transcript is the final version of the transcript. As used herein, the term "final" transcript includes a final transcript or a non-final transcript which has been revised since the draft transcript was provided to the user. Preferably, the final transcript is embodied in a file which has been electronically signed by the court reporter and can be authenticated by its recipients as, in one example, is described in co-pending U.S. Patent Application Ser. No. 60/209,809 filed Jun. 5, 2000, entitled APPARATUS, SYSTEM, AND METHOD FOR ELECTRONICALLY SIGNING ELECTRONIC TRANSCRIPTS, which is incorporated by reference herein in its entirety. Also incorporated herein by reference is U.S. Provisional Patent Application Ser. No. 60/212,654 filed Jun. 19, 2000, entitled DYNAMIC SEARCH-DRIVEN WORD INDEX FOR AN ELECTRONIC TRANSCRIPT DISPLAYABLE ON HAND-HELD PORTABLE COMPUTING DEVICE.

In one example, the transcript file (either draft or final) can be received via e-mail, a floppy disk, CDRom, network connection, serial port, or the like. Further, the transcript file can be an ASCII file with or without page numbers and line numbers, being in AMICUS format, a page image format, an electronic transcript format as an executable, or in a PTX format, a live note PTF file, an XML transcript, or a transcript resulting from a real time feed from a serial line (i.e., RS232), the internet, or a file, or the like.

Figure 2:
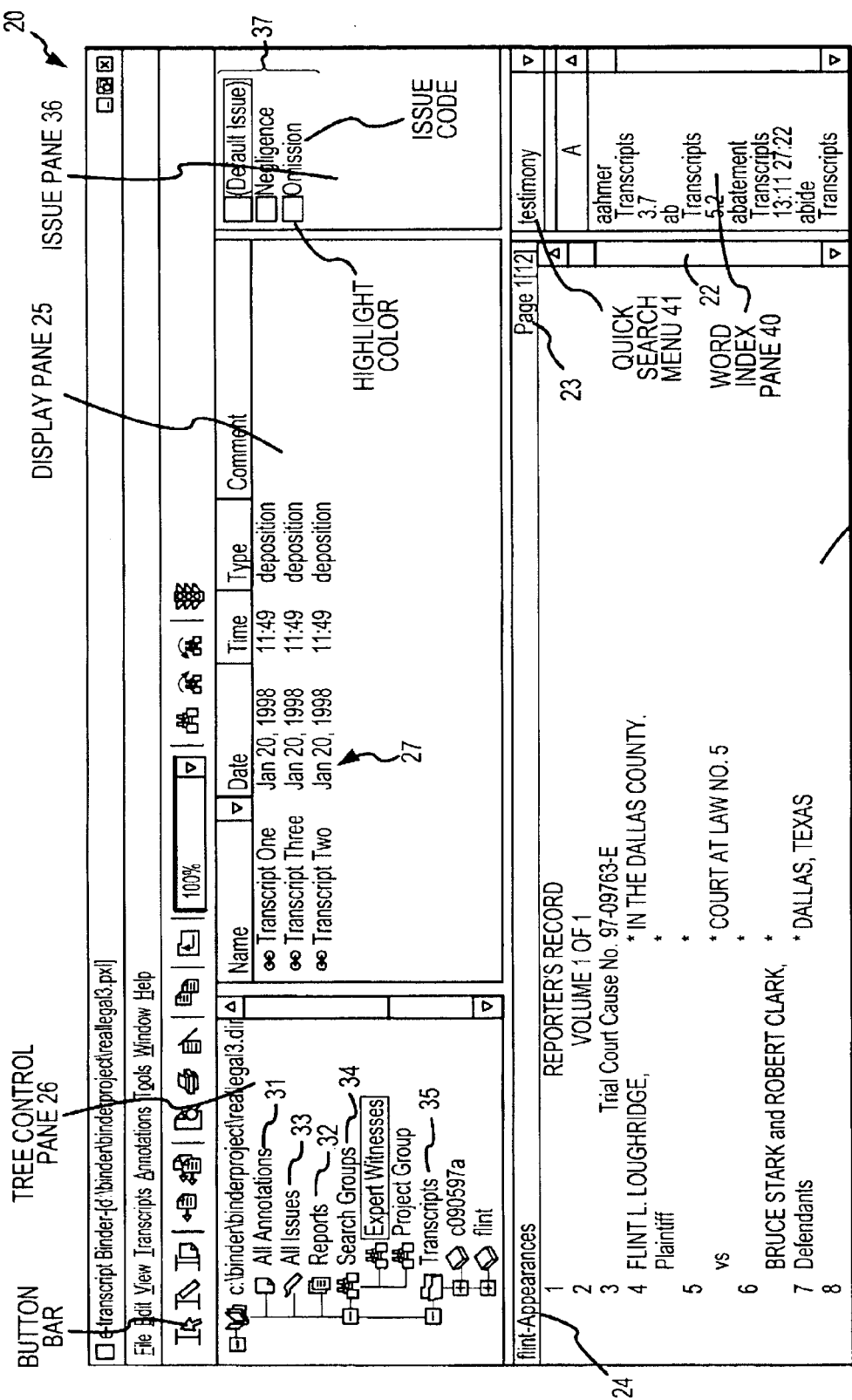
FIG. 2 illustrates an example of a screen display in accordance with one embodiment to the present invention.

Referring to FIG. 2, an example of a display screen of the transcript management software is shown. Referring to FIG. 2, a transcript pane contains the text of the electronic transcript being presently displayed to the user. The transcript pane includes a scroll bar, a page indicator, and the title of the transcript.

Figure 6:
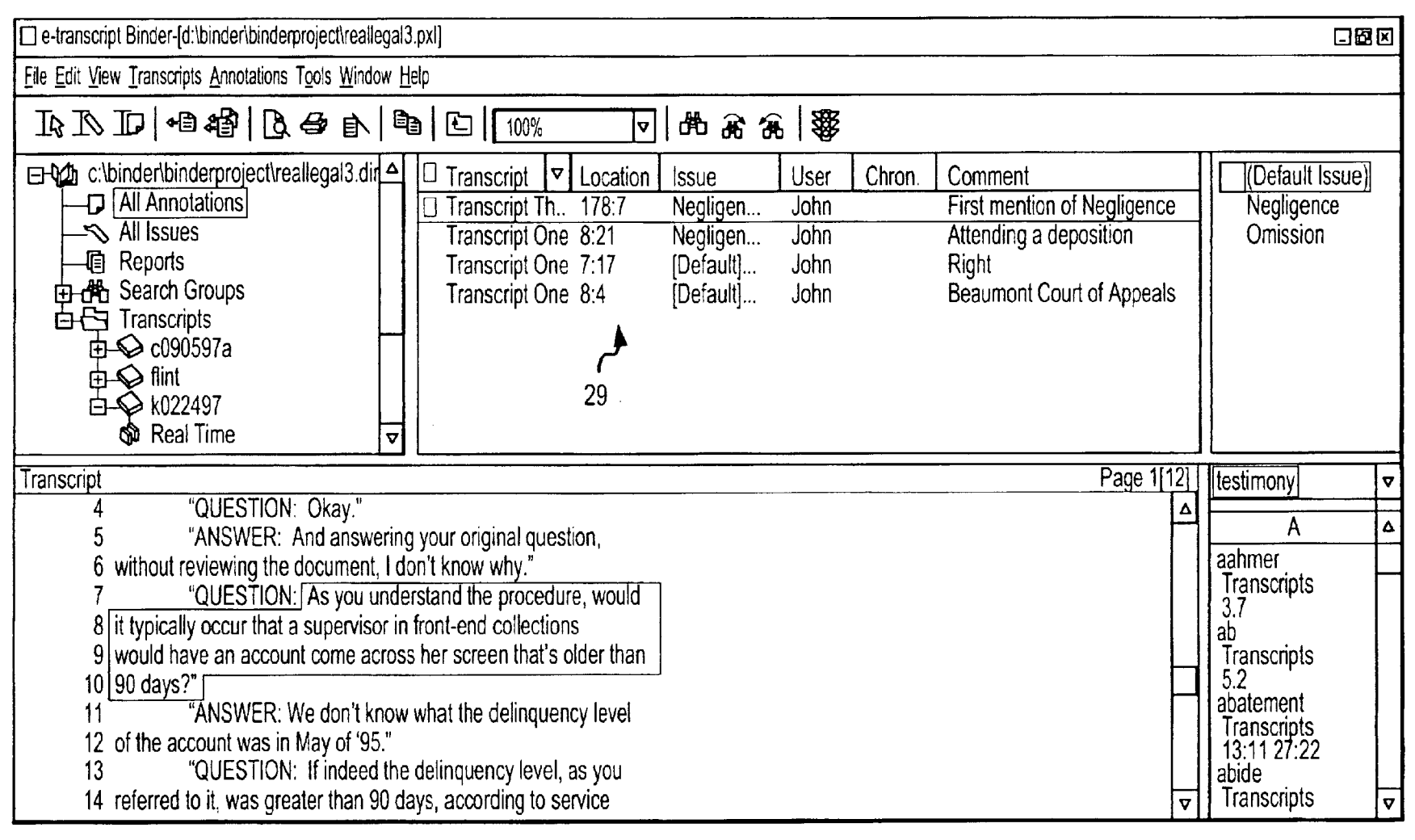

A display pane displays various information depending upon what the user has selected within the tree control pane. For example, the display pane can show a list of transcripts which form a user-selected group of transcripts (see FIG. 2), a list of issue codes or annotation subjects (see FIG. 4), a list of issues and comments as they appear in one or more transcripts (see FIG. 6), a table of contents relating to the structural elements of a particular transcript (see FIGS. 7, 8, and 9).

The tree control pane generally illustrates a tree structure of a project, wherein a project is a collection of one or more transcripts, and the collection of transcripts can be subdivided into subgroups. In accordance with embodiments of the present invention, a variety of operations can be performed on the transcripts within a project, such a search operation, a report generation operation which creates a search report or an annotation report, an annotation operation, an issue code operation, a comment operation, a table of contents with hyperlinks, and a printing operation, for example. The tree control pane shows the various subcomponents of a project which include annotations, reports, issues, search groups, and transcripts, being either static transcripts or live transcripts received from a real time feed (see FIG. 11 for example).

An issue pane is shown which lists the name of an issue (such as "negligence," "omission," "default issue") as well as a user-selected highlighting color associated with the particular issue. Further, as shown in FIG. 4, upon the user selecting "All Issues" from the tree control, the display pane shows the master list of all issues available for the project, and permits the user to enable or disable the display of particular issues within the issue pane. For instance, if the user selects the issue labeled "default issue" in the issue pane, then when the user makes a new annotation, the new annotation is associated with the "default issue" and highlighted within the transcript in the appropriate color.

Generally, an annotation includes one or more issues or issue codes. The annotation/issue code can include a comment field wherein the user can further add a descriptive comment associated with a particular annotation occurring at a particular location of the transcript, as shown in FIGS.

5–6. The process for making an annotation to a particular section of an electronic transcript is as follows. The user activates the creation of a new issue, and then supplies the name for the issue and selects a corresponding highlighting color. In one example, a plurality of colors is provided from which the user can select to associate the particular issue with a particular highlighting color. The software then adds the new issue to the master list of all issues, and the user can then select text within a transcript to highlight and tag or associate with the particular annotation/new issue. In this manner, the selected text is associated with the selected issue and code. The annotation is associated with the transcript file and can be viewed and accessed by others who later access the transcript file, in one example of the present invention.

Referring again to FIG. 2, a word index pane contains a display of a hyperlink word index for all of the words occurring in a transcript, and preferably for all of the transcripts in a project. In one example, the scope of the word index can be limited to subgroups of transcripts selected by the user. A quick search drop-down menu is provided wherein the user can type in words to initiate a quick search. Alternatively, a full Boolean search can be performed as well. Preferably, the quick search menu has a drop-down feature which remembers the last set of searches entered by the user, as shown in FIG. 8. Furthermore, the word index pane can display a quick preview of the transcript which shows a word selected by the user in context within a smaller preview display of the text around the word selected by the user. For instance, as shown in FIG. 7, the word index pane includes the word "ab" which the preview pane shows in context with the words of the transcript occurring around the word "ab" displayed therein. This permits the user to preview various occurrences of words in the word index pane prior to jumping to those words within the display of the transcript pane.

Figure 3:
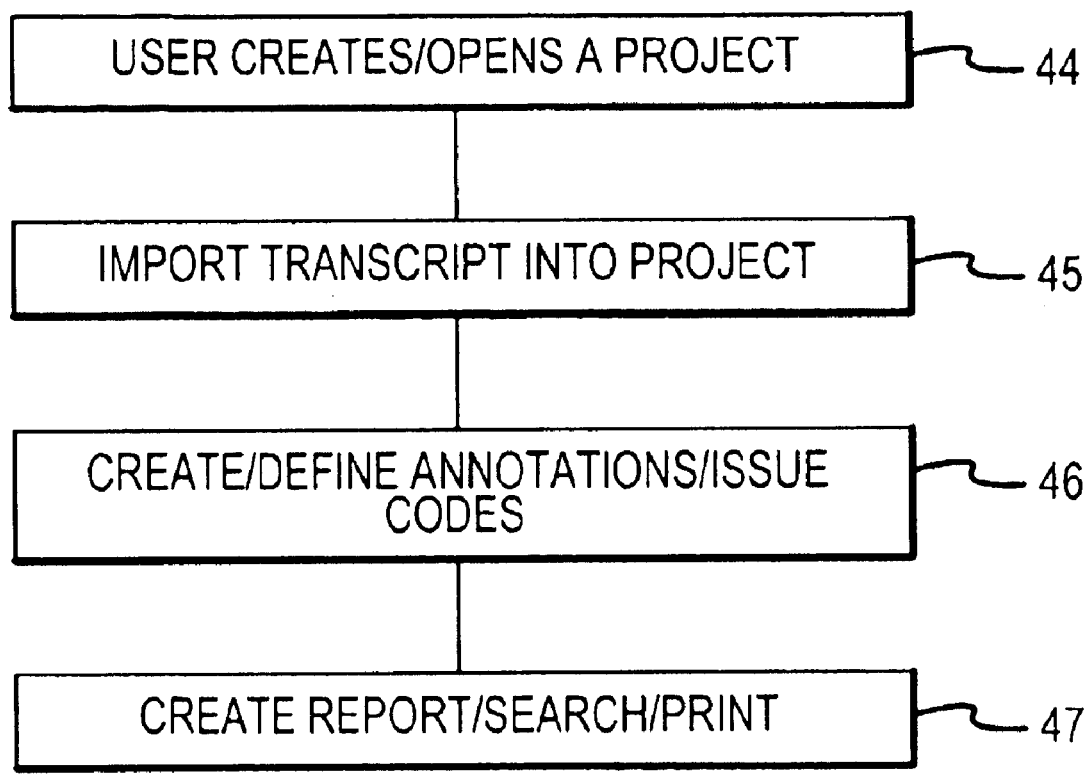
FIG. 3 illustrates the general logical operations of the transcript management software in accordance with one embodiment of the present invention.

Referring now to FIG. 3, the general operations of the transcript management software are illustrated. Referring to FIG. 3, at operation 1, the user creates or opens a project within the transcript management software. As previously mentioned, a project can include one or more transcripts which can be organized into groups or subgroups, as well as reports, search groups, annotation groups, or the like. At operation 2, the user imports a transcript into the project. In one example, the transcript imported is a transcript which is a "draft" transcript, a "final" transcript, or a transcript resulting from a real time datastream. As will be explained below and with reference to FIGS. 10–12, the transcript management software performs various operations in order to import a transcript into the transcript management software. These operations include analyzing the contents of a transcript to detect structural elements such as the beginning of a direct examination, a cross-examination, question and answer pairs, a change of speaker, or the like (FIGS. 10, 21–23); processing data from a real time transcript (FIG. 12); and transferring the annotations associated with a draft transcript to a final transcript for use therewith (FIGS. 13–20).

Again referring to FIG. 3, at operation 3, the user creates and defines annotation and issue codes to be associated with the transcript presently being operated upon by the user. Further, the user can view the various annotations and issue codes present within the transcript, as well as perform other functions as previously described herein, such as quick searching, creation of a report including search results, printing, etc., as shown at operation 4 of FIG. 3.

Figure 9:
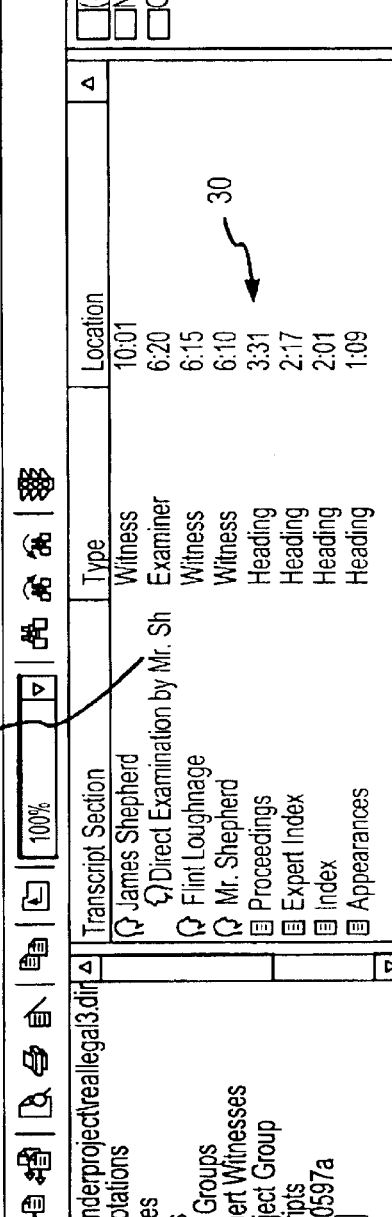
FIG. 9 illustrates an example of a screen display showing the structural elements of a particular transcript within the display pane in accordance with one embodiment of the present invention.
Figure 10:
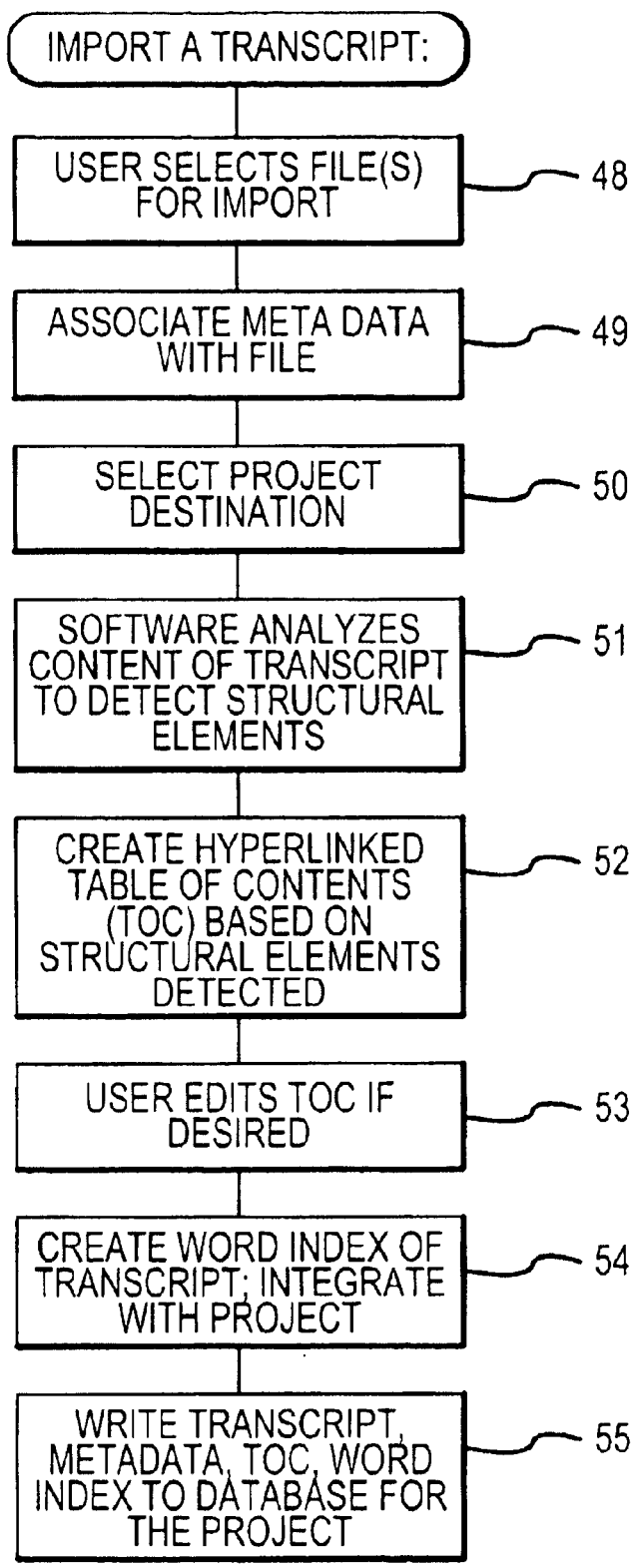
FIG. 10 illustrates the logical operations for importing a transcript into the transcript management software, in accordance with one embodiment of the present invention.
Figure 21:
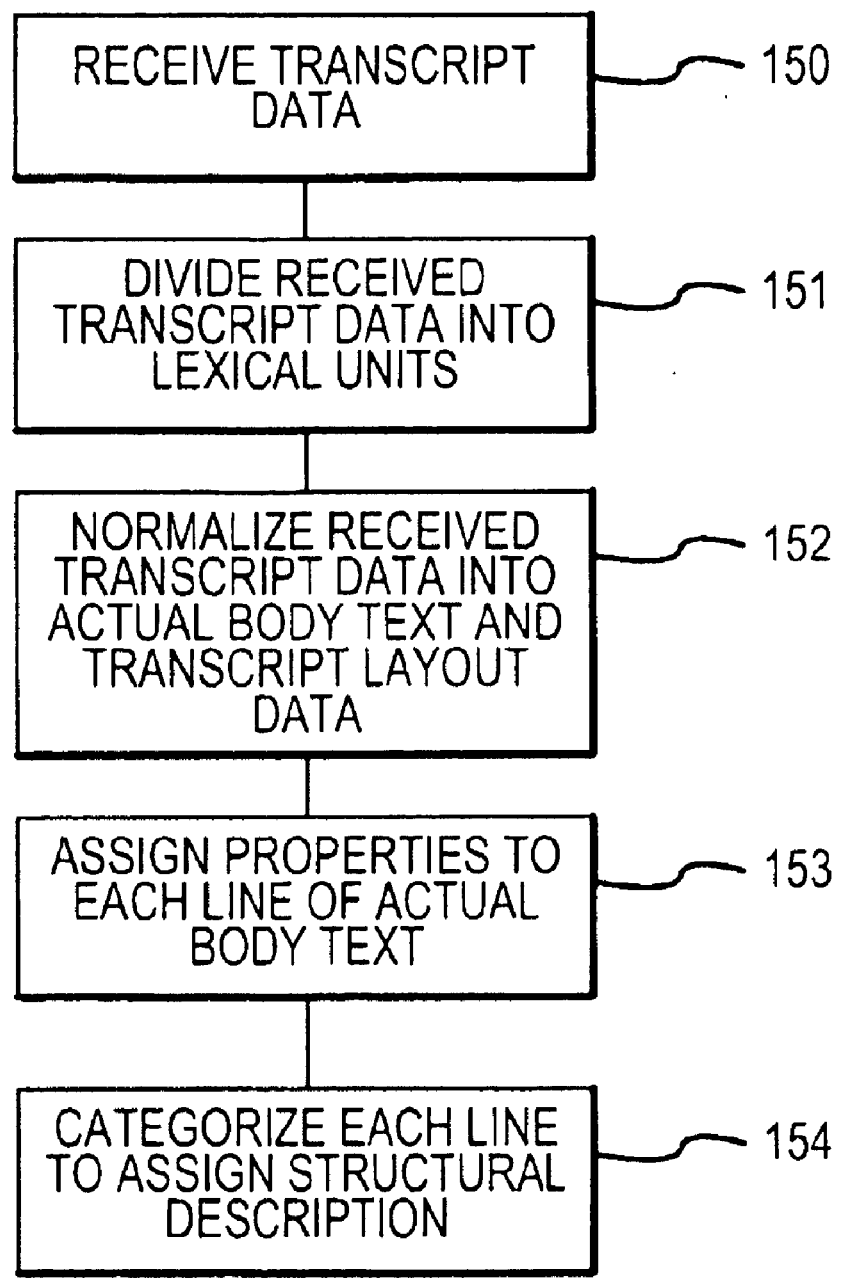
FIG. 21 illustrates the logical operations for analyzing the structural components of transcript data from a real time stream or a transcript file, in accordance with one embodiment of the present invention.
Figure 22B:
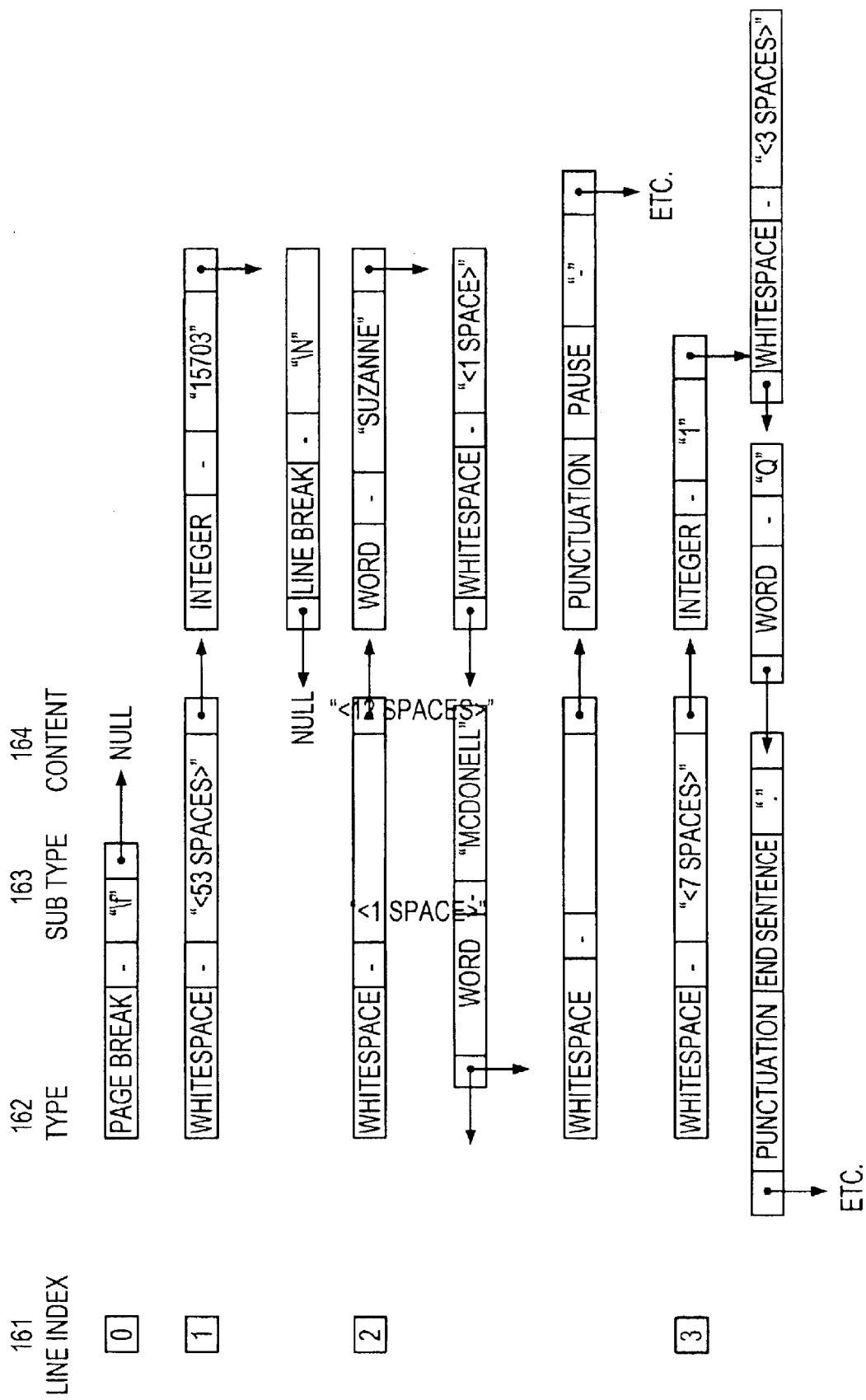
FIGS. 22-A illustrate an example of transcript data analyzed in accordance with one embodiment of the present invention.
Figure 23:
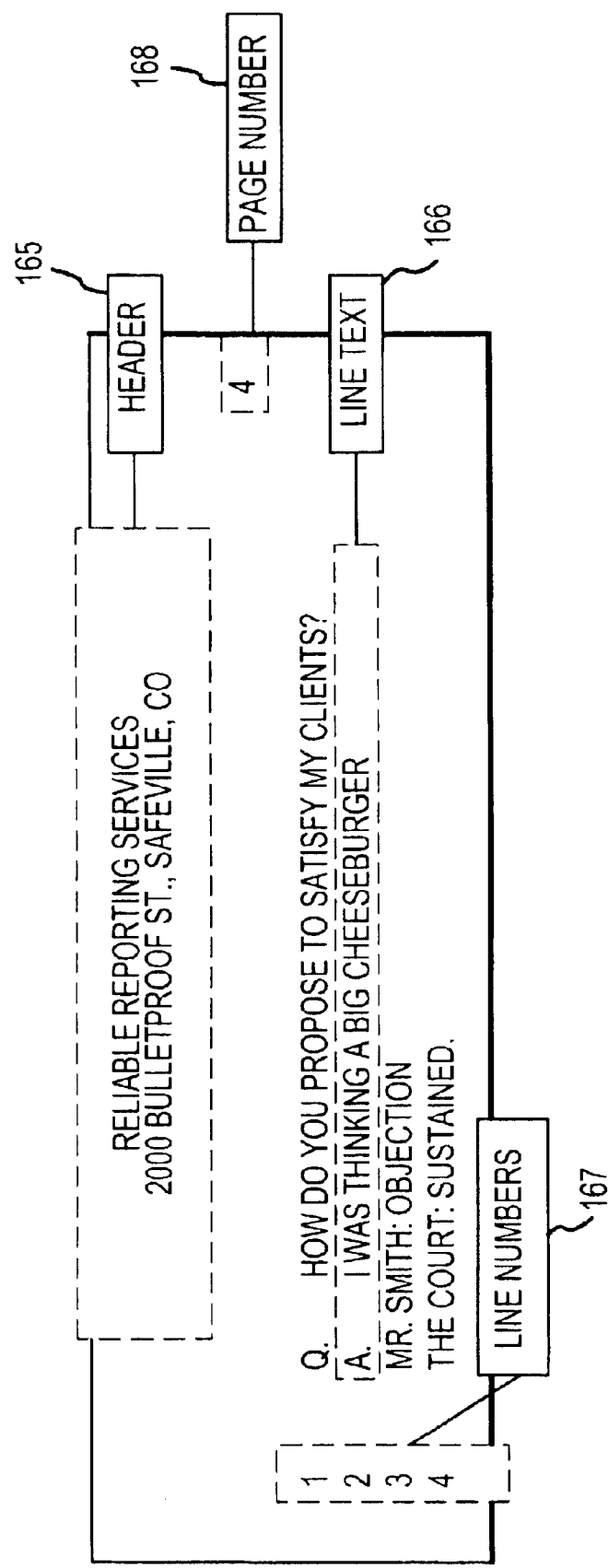
FIG. 23 illustrates an example of transcript data to be analyzed in accordance with one embodiment of the present invention.

Referring now to FIG. 10, one example of the logical operations for importing a transcript in accordance with one embodiment of the present invention is illustrated. At operation 1, the user selects the transcript file for import. The user can associate metadata with the file at operation 2, for example, the name of the proceeding, the volume number of the transcript, the deponent's name, the parties, whether the transcript is final or draft, the date, time, type of transcript (deposition of a witness or an expert), and the like. At operation 3, the user selects the project destination by selecting an appropriate folder in the tree control. At operation 4, the software analyzes the content of the electronic transcript to detect its structural elements. Preferably, the software reads the page number and line numbers of the transcript, and detects witnesses, change of witnesses, question and answer pairs, direct examination, cross-examination, each new quotation, and references to exhibits. FIGS. 21–23 and the text associated therewith describe operation 4 of FIG. 10 in greater detail in accordance with one embodiment of the present invention. At operation 5 of FIG. 10, a hyperlinked table of contents is created based upon the structural elements detected at operation 4. The user can edit the hyperlinked table of contents if desired at operation 6. As shown in FIG. 9, the table of contents of the transcript can identify sections of a transcript corresponding to witness testimony, direct examination, change of witnesses, proceedings, exhibit index, a general index, and appearances, or the like.

At operation 7, a word index of the transcript is created for display within the word index pane of the display. Preferably, the word index is integrated with the word index of other transcripts within a project so that the word index is a "global" word index having references to words appearing in one or more transcripts of a project. At operation 8, preferably the transcript, metadata, hyperlinked table of contents, and word index are written to a database for the project. At this point, the transcript is then usable and accessible to the user within the transcript management software.

Figure 11:
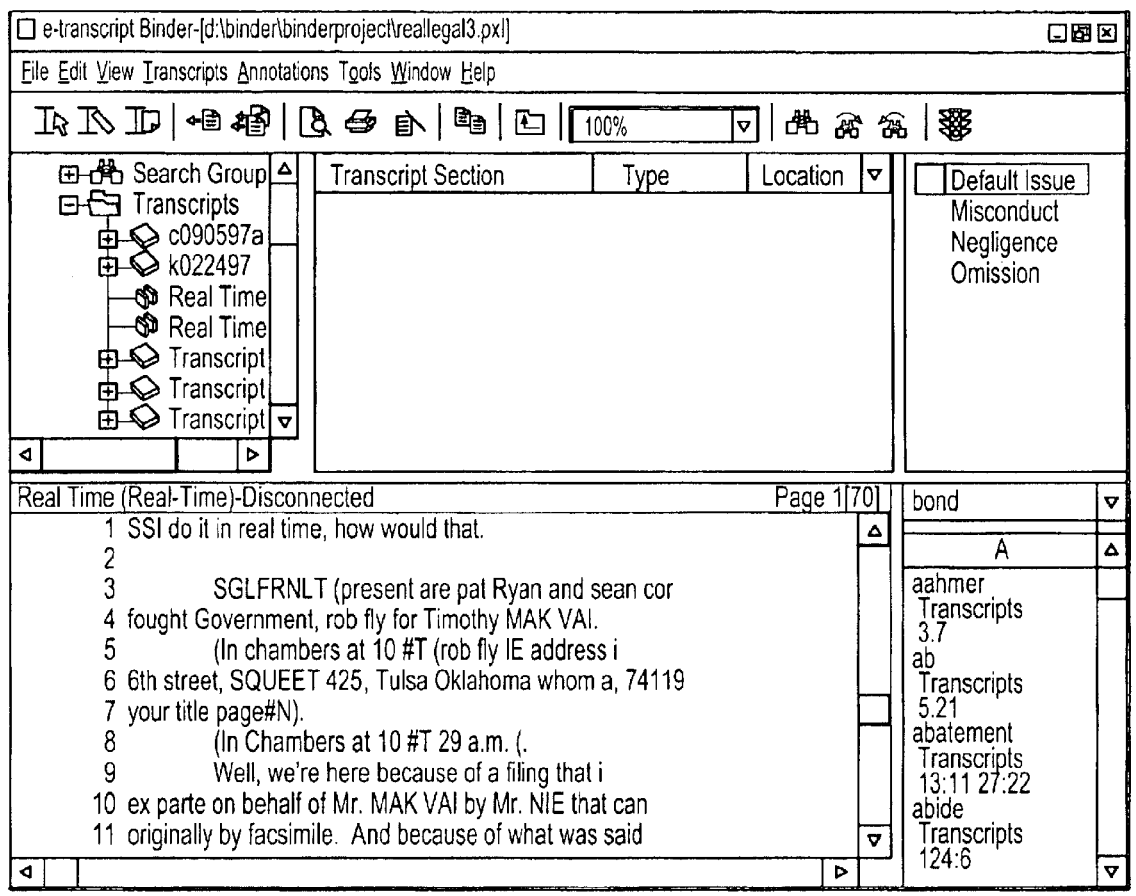
FIG. 11 illustrates an example of a screen display showing a real time transcript in the transcript pane in accordance with one embodiment of the present invention.
Figure 12:
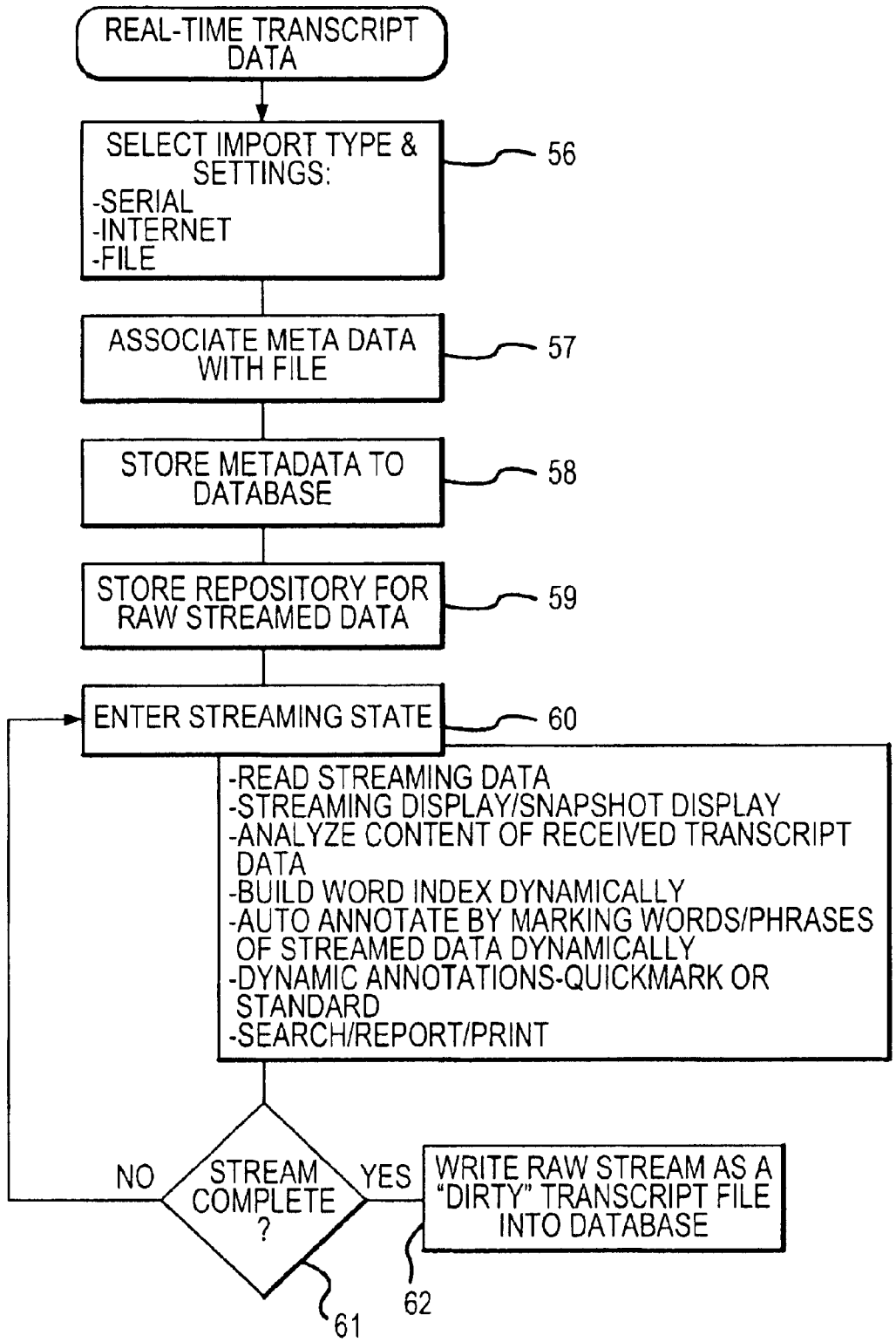
FIG. 12 illustrates the logical operations for processing real time transcript data, in accordance with one embodiment of the present invention.

The operations as illustrated in FIG. 10 are generally applicable for importing a transcript file. Embodiments of the present invention further support the importation of real time transcript data as illustrated in FIG. 11 and by the logical operations of FIG. 12. Referring to FIG. 12, at operation 1, the user selects the import type and settings, such as a serial import (which preferably includes a baud rate setting), an internet import (optionally with a user name and password), or a file import which contains real time transcript data therein, and the like. At operation 2, the user can associate metadata with the real time transcript data, in a similar manner as described with reference to operation 2 of FIG. 10. At operation 3, the metadata is stored to the database, and at operation 4, the location of the repository for the raw datastream of the real time transcript data is specified so that the real time transcript data can be stored as it is received by the transcript management software. At operation 5, a streaming state is initiated wherein real time transcript data is received by the transcript management software and processed therein. As the data is streaming, the transcript management software permits the transcript pane of the display to be either a streaming display, or a snapshot display. Preferably, the snapshot display is a display which is paused and can be manipulated by the user within the transcript pane of the display, while in a background process the streaming data is still being received and stored in an internal buffer of the transcript management software. Preferably, the snapshot display mode is enabled or disabled through the use of a single keystroke operation, such as the depression of the return key, or the like. Further, during the streaming state operations, the transcript management software analyzes the content of the received transcript data, in a manner similar to operation 4 of FIG. 10. Further, a word index is dynamically created as the streaming data is received.

As real time streaming transcript data is received, in accordance with the present invention, words and phrases of the streamed data can be dynamically marked through an "auto annotation" feature of the present invention. The auto annotation operations include providing for a user to specify one or more words or phrases which should be highlighted using a particular issue code which preferably includes a highlight color and an issue description. As the streaming text is received by the transcript management software, whenever the particular word or phrase specified by the user is received, the software automatically creates an annotation marking the specified word or phrase using the specified issue code. The user can specify the desired words or phrases for annotation either prior to entering the streaming state, or during receipt of streaming data (such as within the snapshot display mode).

Further, dynamic annotations using a quick annotation feature (which preferably applies a one-line annotation to the current streaming line received during a real-time session, or issue codes, described above, can also be made during the streaming state, preferably during a snapshot display of the transcript text. Preferably, annotations are stored to the database as they are created. Because the streaming data is analyzed as it is received within the streaming state, embodiments of the present invention permit dynamic searching, report generation, and printing of transcript data as it is received. At decision operation 6, if the stream is complete, then control is passed to operation 7 wherein the raw data stream are written as a draft or "dirty" transcript file into a database for persistent storage.

As illustrated in FIG. 12, storage of real time transcript data results in a draft transcript. The court reporter would, at some time later, issue a final or revised transcript which corrects any typographical errors and preferably contains a certification page and an electronic signature within the final transcript as described in the "APPARATUS, SYSTEM, AND METHOD FOR ELECTRONICALLY SIGNING ELECTRONIC TRANSCRIPTS" patent application, referenced above. In accordance with the present invention, the annotations created and associated with a draft transcript can be transferred to and associated with a final electronic transcript for use therewith. While a draft transcript was described with reference to FIG. 12 as being a result of receiving real time transcript data, it is understood that a draft transcript can include more generally any non-final draft version of the transcript, either from a real time datastream or from an e-mail transcript file sent by the court reporter soon after the deposition or court proceeding being transcribed was finished.

Figure 13:
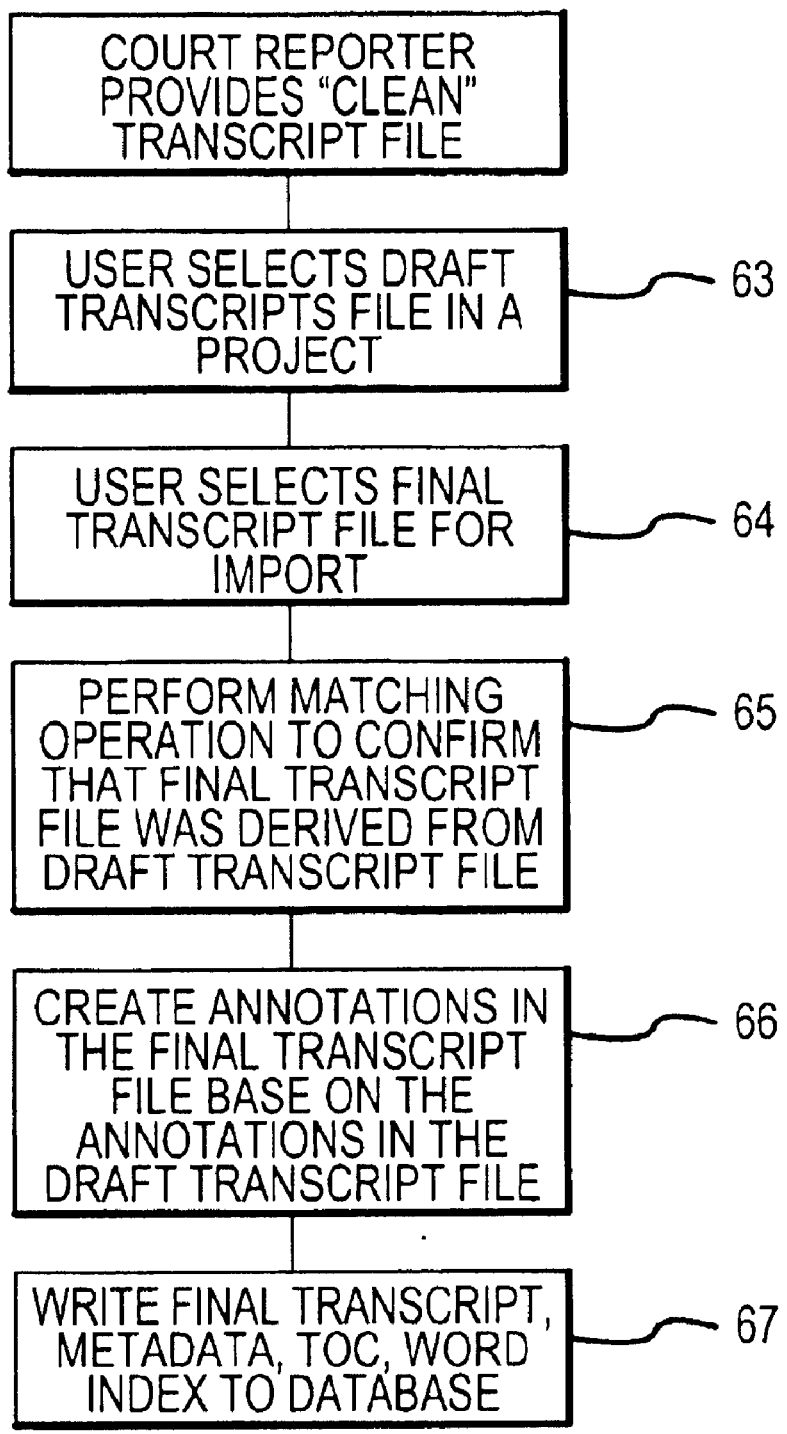
FIG. 13 illustrates the logical operations for synchronizing a final transcript to an earlier draft transcript in accordance with one embodiment of the present invention.

FIGS. 13–20 illustrate examples of the logical operations for creating annotations in a final transcript based on the annotations previously created in a draft transcript file. These operations assume the existence of a draft electronic transcript file which the user has created and associated therewith annotations and issue codes as previously described. Further, these operations assume that the court reporter has provided a final or revised electronic transcript file which is accessible to the user through the transcript management software. Referring to FIG. 13, at operation 1, the user selects the draft transcript file in a project, and at operation 2, the user selects the final transcript file for import. Preferably, the operations for importing a transcript file shown in FIG. 10 are performed, with the exception that operations 7–8 of FIG. 10 (writing data to the database) are preferably not performed until later, as will be described below.

Figure 17B:
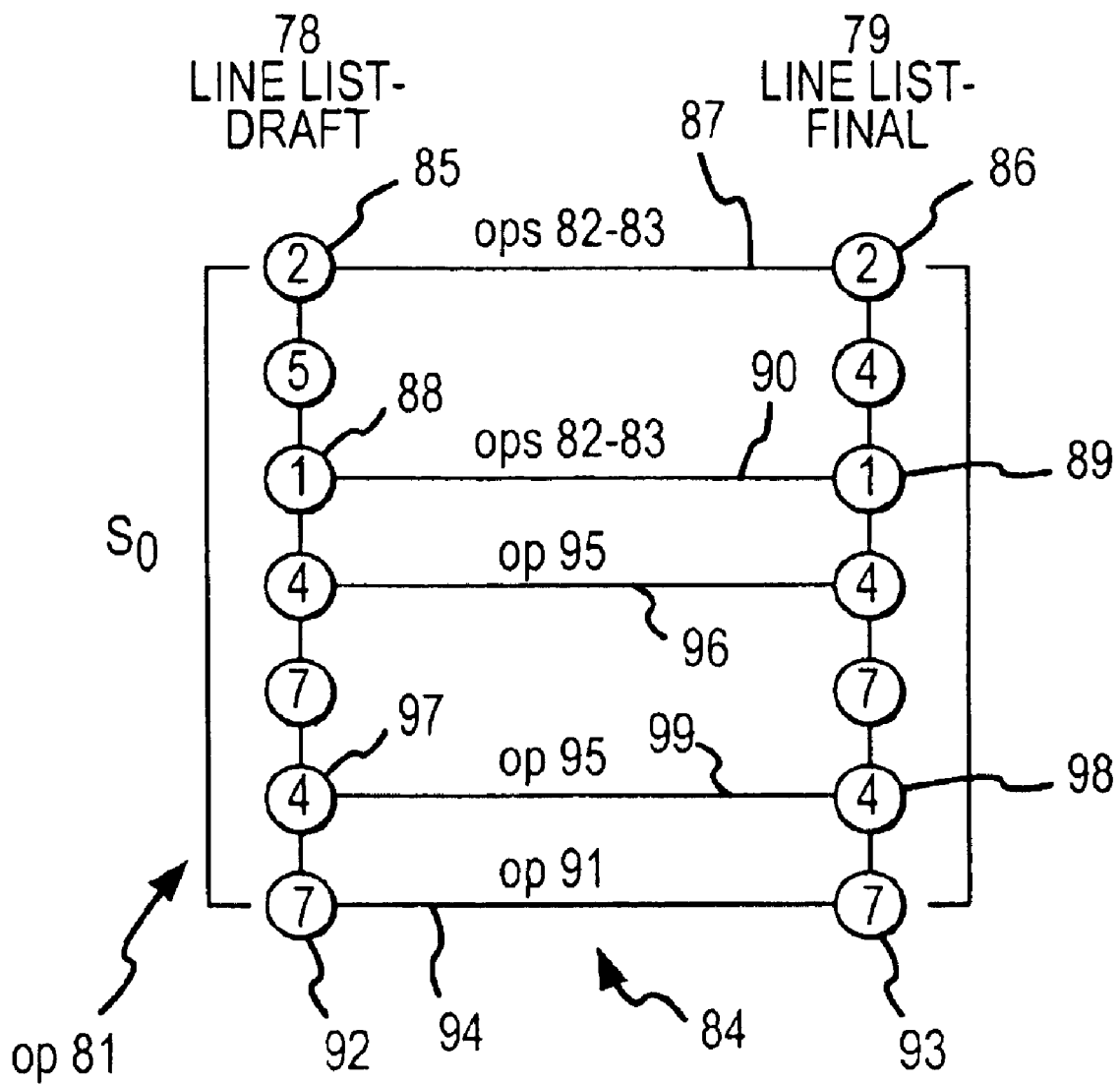
Figure 17C:
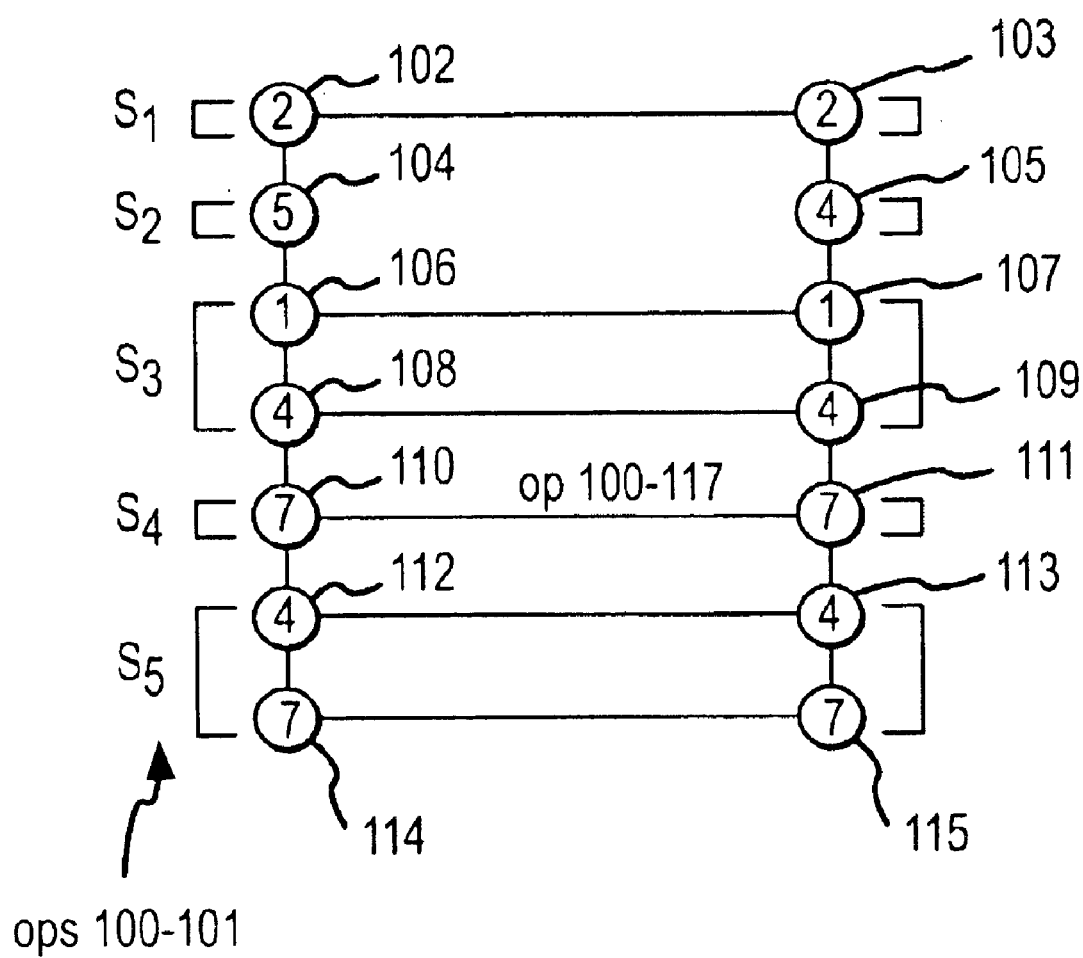
Figure 17D:
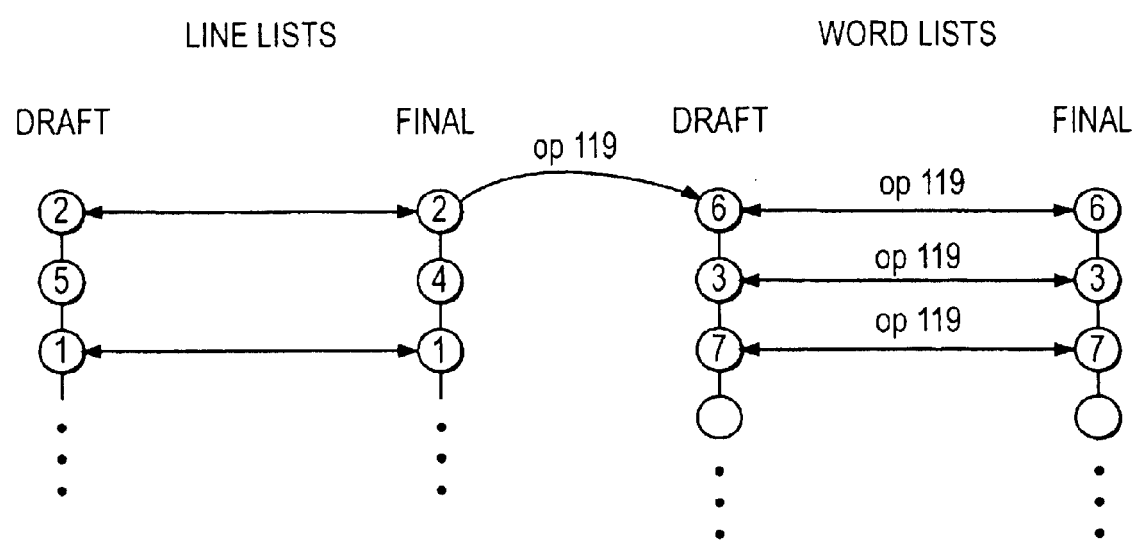
Figure 18:
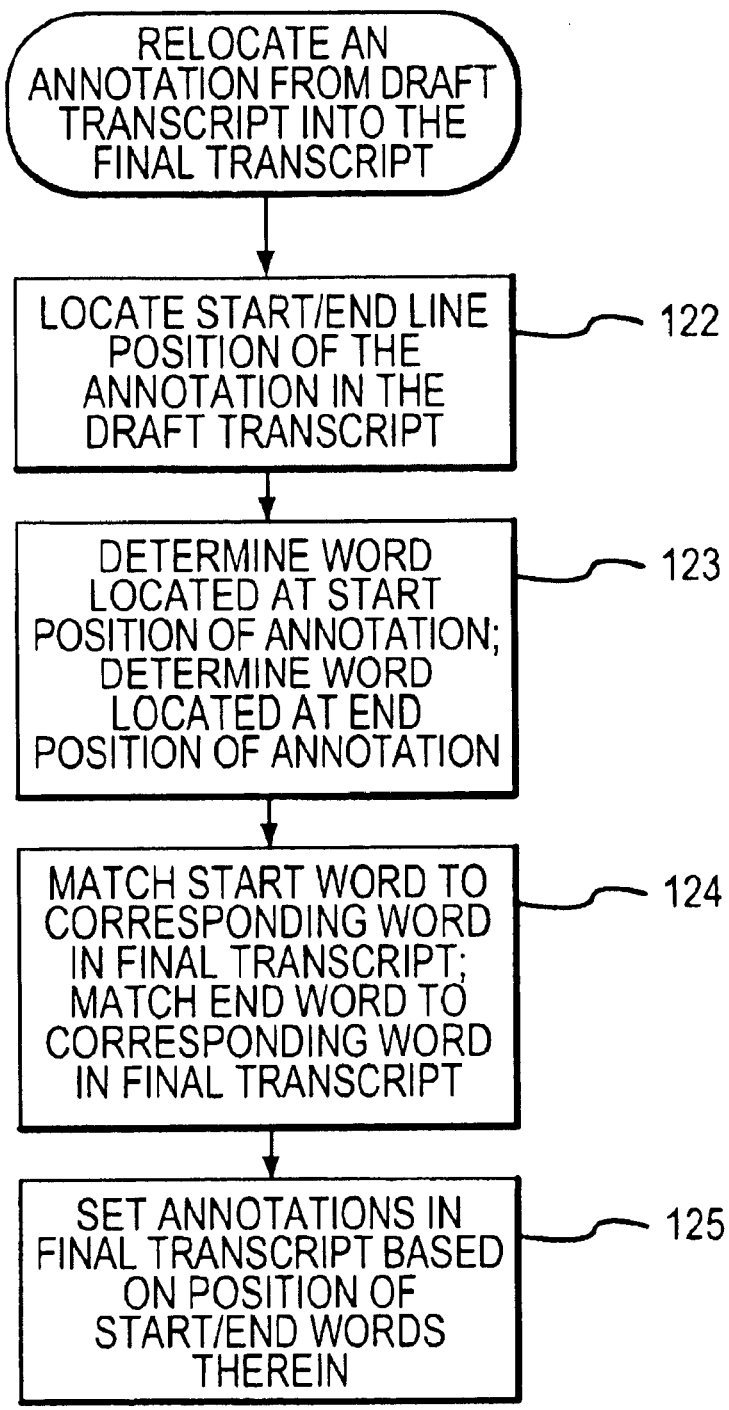
FIGS. 18–19 illustrates the logical operations for relocating an annotation from a draft transcript and to a final transcript, in accordance with one embodiment of the present invention.
Figure 19:
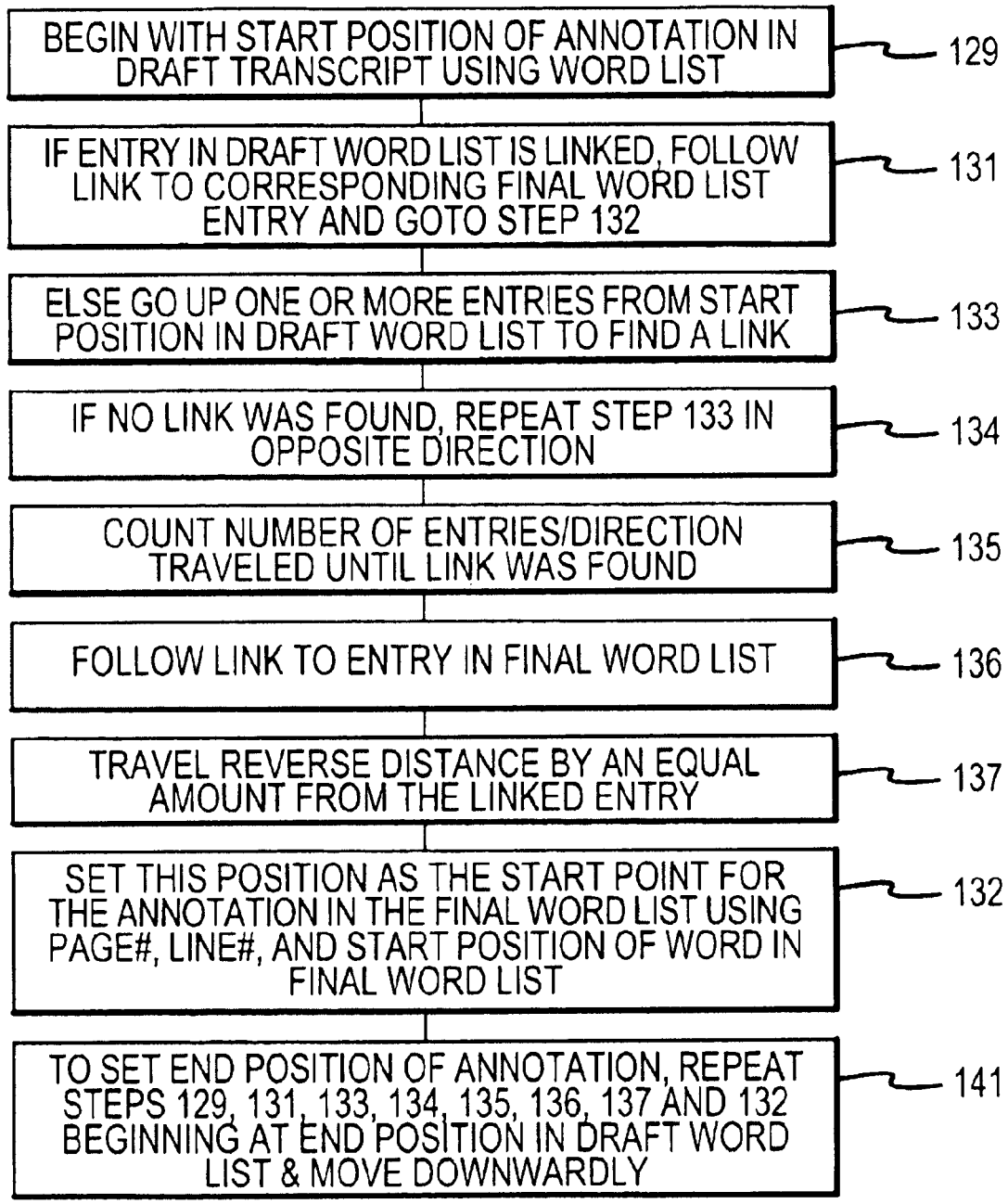

At operation 3 of FIG. 13, a matching operation is performed which confirms that the final transcript file was derived from the draft transcript file. In one example, the final and draft transcript files are analyzed using a match algorithm to confirm that the final file appears to be derived from the draft file. In one example, operation 3 of FIG. 13 can be implemented as shown in FIGS. 14–17. After confirming that the final transcript was derived from the draft transcript, operation 4 of FIG. 13 creates annotations in the final transcript file based on the annotations associated with the draft transcript file. In one example, operation 4 of FIG. 13 can be implemented as shown in FIGS. 18–20. Operation 5 of FIG. 13 then writes the final transcript, the metadata associated therewith, the hyperlinked table of contents, and the word index to the database. Preferably, operation 5 replaces the draft transcript with the final transcript and the annotations created by the user in the draft transcript file are automatically moved or associated with the final transcript file.

Figure 14A:
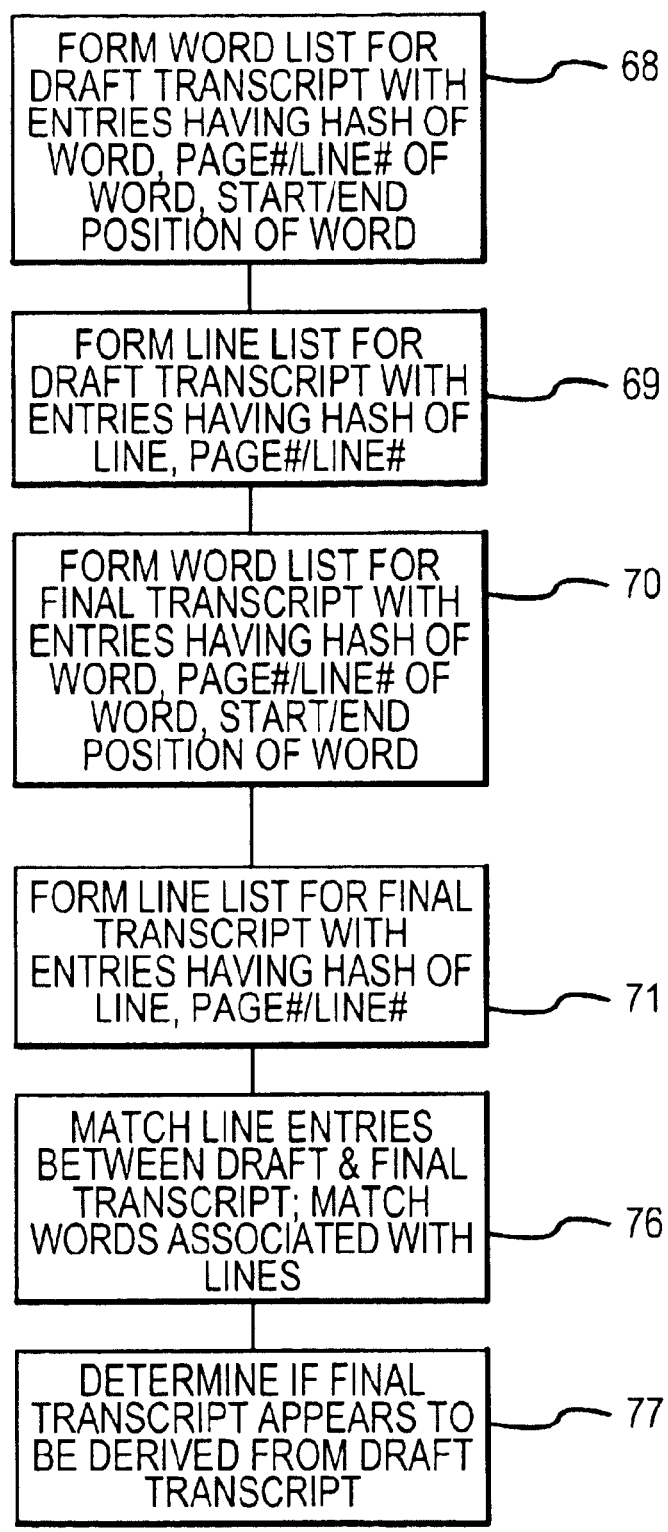
FIGS. 14 A–B illustrate the logical operations for linking the lines and words of a final transcript to a draft transcript, in accordance with one embodiment of the present invention.

FIG. 14A illustrates one example of the logical operations for performing a matching operation to confirm that the final transcript file was derived from the draft transcript file, in accordance with one embodiment of the present invention. For both the final and draft transcript files, preferably a line list and a word list is created for each file, and the contents of the lists are compared and linked to determine if the final transcript file was derived from the draft transcript file and to determine where the annotations from the draft transcript should be located within the final transcript file. Operations 1–4 of FIG. 14A generate the word lists and line lists for the draft and final transcripts, and it is understood that the order in which operations 1–4 are performed is a matter of choice depending on the particular implementation.

At operation 1, a "word list" for the draft transcript is formed which preferably has, as entries in the list, a hash of each word of the transcripts. A hash operation is performed on each word of the draft transcript and a list is created thereof. The length of the word list is preferably the number of words in the draft transcript.

In one example, the hash operation is preferably as shown in FIG. 14B. A hash operation in effect creates a unique numerical representation of a string of characters. Preferably, as shown in FIG. 14B, the hash algorithm ignores white spaces and, for a given unique string input into the hash algorithm, a unique number is preferably returned. In this way, the content of a particular string (such as a word or a line of words) of a transcript can be uniquely represented with a single numerical value. Ideally, if the hashed numerical representation of a word from the final transcript is identical to the hashed numerical representation of a word from the draft transcript, then the words of the transcripts represented by the hashed values are identical.

Preferably, each entry in the word list for the draft transcript also has a page number and a line number indicating where the word being hashed occurred within the draft transcript, a start position indicating the character position within the line where the word started within the draft transcript (i.e., the number of spaces measured from the left-most side of the transcript to the first character of the word), and the end position of the word (i.e., the number of character spaces measured from the right most side of the transcript to the last character of the word).

At operation 2 of FIG. 14A, a "line list" for the draft transcript is created, wherein each entry in the list includes a hash of the line of the draft transcript, and the page number and line number of where the line being hashed occurred within the draft transcript. At operation 2, a hash operation is performed on each line of the draft transcript, and preferably, the list created therefor has an entry for each numerical value resulting from the hash operation performed on each line of the draft transcript, the numerical values representing the content of each line of the draft transcript. The hash operation preferably is as shown in FIG. 14B. In one example, the number of entries in the line list is equal to the number of lines in the draft transcript.

Figure 15:
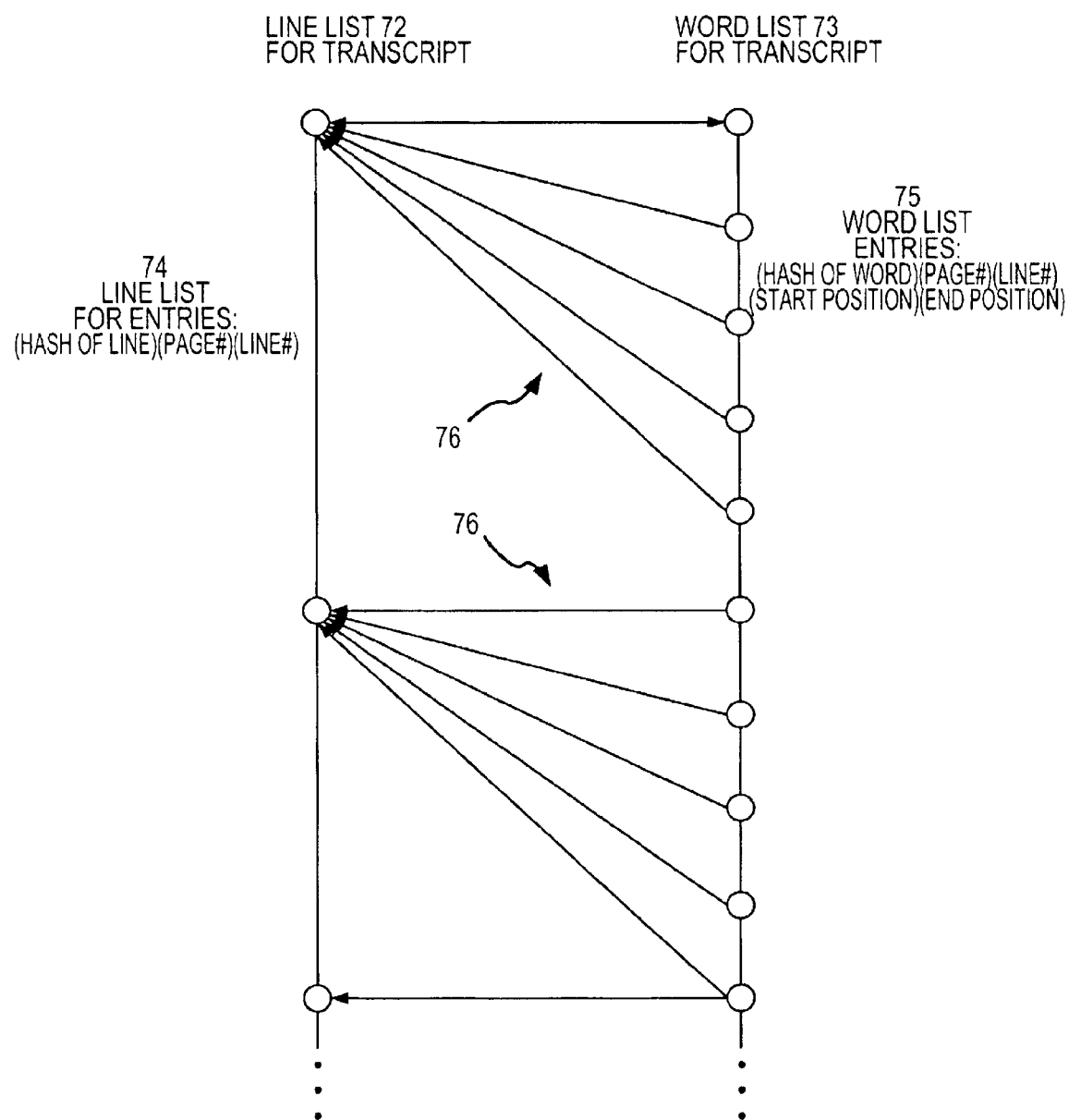
FIG. 15 illustrates an example structure of a line list of a transcript and a word list of a transcript in accordance with one embodiment of the present invention.

Together operations 1 and 2 create lists which are representative of the contents of the draft transcript. FIG. 15 illustrates one example of the structure of a line list for a transcript, and a corresponding word list for the transcript in accordance with one embodiment of the present invention. As shown in FIG. 15, the line list is shown as having a plurality of entries, preferably in sequential order; while the word list for the transcript is shown as having the plurality of entries, preferably in sequential order, wherein each entry has a corresponding link or pointer to the respective line at which the word occurs within the given transcript, and vice versa.

Referring back now to FIG. 14A, at operation 3, word list for the final transcript is formed in a manner similar to operation 1 of FIG. 14A, in that each entry in the word list for the final transcript contains a hash of each word of the final transcript, and the page/line number and start/end position of the word as it occurred in the final transcript.

At operation 4, a line list for the final transcript is formed in a manner similar to operation 2 of FIG. 14A, in that the entries of the line list each have a hash of the line from the final transcript and the page/line number of where the line being hashed occurred within the final transcript. Accordingly, the line list and word list for the final transcript will generally have the structure as shown in FIG. 15.

In general at operation 5 of the FIG. 14A, the transcript management software matches the lines between the draft and final transcript by using the line lists and comparing the hashes contained within each entry of the line lists. For each matching line as determined by operation 5, the word list entries associated with those matching lines are also matched together by comparing the hashes of the words contained within the respective entries of the word lists.

At operation 6, the transcript management software determines if the final transcript appears to be derived from the draft transcript, and if so, annotations from the draft transcript can be associated with the final transcript in the proper respective positions, as will be described below.

Figure 16:
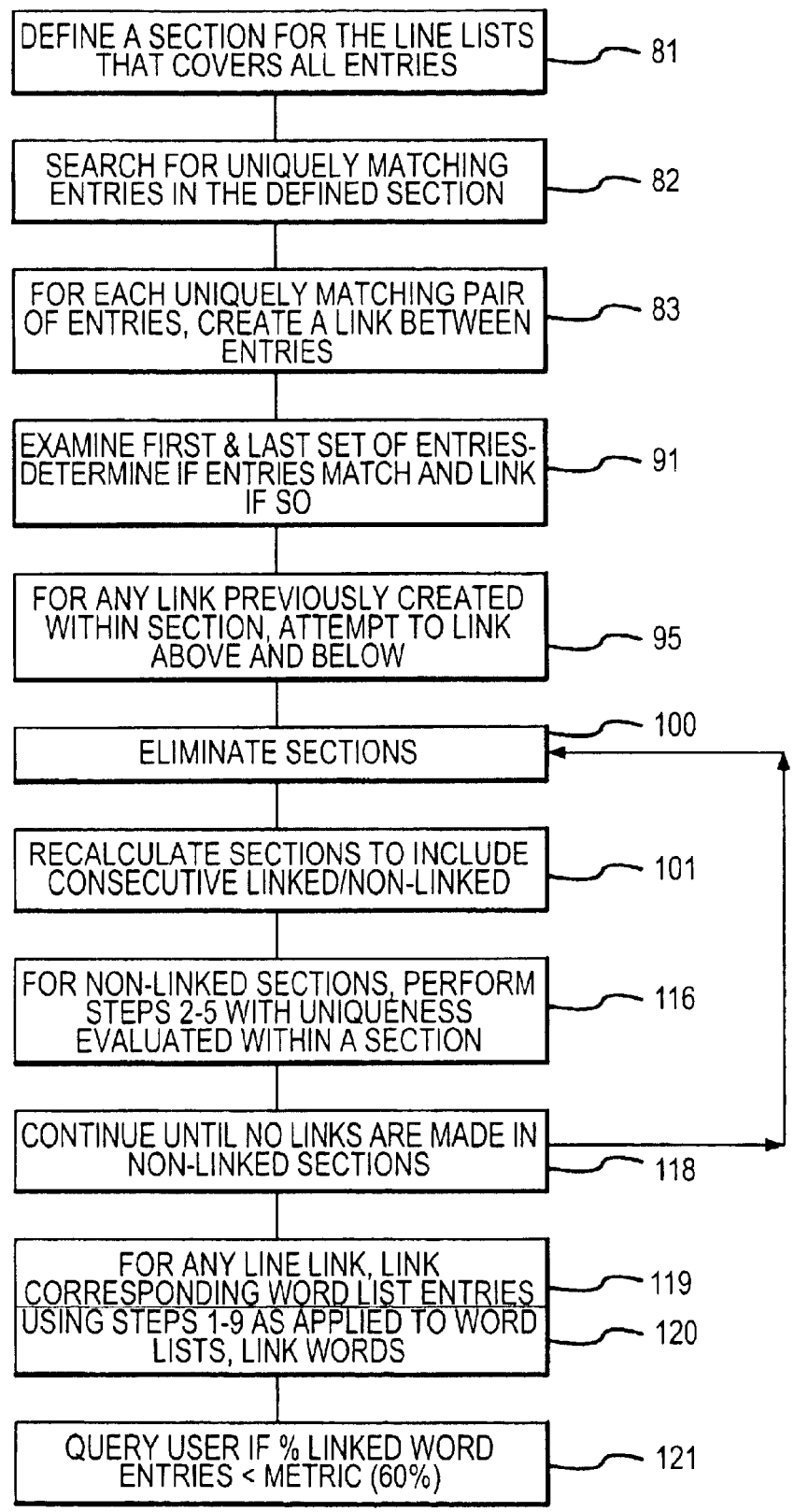
FIG. 16 illustrates the logical operations for linking the line and word list of a final transcript to the line and word lists of a draft transcript, in accordance with one embodiment of the present invention.

FIG. 16 illustrates one example of the logical operations for matching the lines and words of the line lists and word lists of the final transcript and the draft transcript, in accordance with one embodiment of the present invention.

The operations in FIG. 16 will be described, and examples of these operations will be shown with reference to FIGS. 17A–D for purposes of illustration. FIG. 17A illustrates an example line list for a draft transcript and an example of a line list for a final transcript. The example draft line list has seven entries with the hash value indicated within each entry. For instance, the second entry in the example line list for the draft transcript shown in FIG. 17A has a hash value of five for illustrative purposes. FIG. 17A also shows an example of a line list having entries representing the contents of a final transcript, wherein each entry is shown having the hash value of the line of the final transcript, for illustrative purposes. FIGS. 17B–D illustrate one example of the operations of FIG. 16, as will now be described.

Referring to FIG. 16, operation 1 defines a section that preferably encompasses or covers the entries in the draft line list and the final line list. One example of operation 1 is shown in FIG. 17B, wherein a section $S_0$ has been defined to cover the entries in both the line list of the draft transcript and the line list of the final transcript.

Referring to FIG. 16, operation 2 searches for unique matching line entries between the line lists for the draft and final transcripts within the section defined by operation 1. In one example, each entry in the draft line list is examined and the hash value thereof is compared to the hash value of each entry in the final line list to determine if there is a unique match therebetween. In this sense, a match is "unique" preferably if the hash value matched between entries occurs only once in each respective defined section of both line lists. In other words, if an entry the draft line list has a identical matching hash value which occur in more than one of the entries in the final line list, then the match is not unique. Conversely, if an entry in the draft line list has a hash value which occurs identically in only one entry of the defined section of the final line list, then the match is unique.

Operation 3 of FIG. 16 creates a link from the draft line list to the final line list for each pair of uniquely matching entries. In one example, the link is formed by providing, within each entry of the uniquely matching pair, an address or pointer to the other entry of the uniquely matching pair. Referring now to FIG. 17B, examples of operations 2 and 3 are illustrated. For instance, referring to the top entry in the draft line list, the hash value therein is two, which uniquely matches the top entry in the final line list because no other entries in the final line list have a hash value of two. Accordingly, a link is formed therebetween. Similarly, the entry in the draft line list having a hash value of one uniquely matches an entry in the final line list, and accordingly a link is made therebetween. Note that a link is not made at this time between any other entries because the remaining entries, while some are matching entries, are not uniquely matching entries since their respective hash values occur more than once.

Referring again to FIG. 16, operation 4 determines if the first and last set of entries within the defined section are matching entries, regardless of their uniqueness and a link is formed therebetween if the entries have matching hash values. An example of this operation is shown in FIG. 17B wherein the bottom entries both have the hash value of 7, and therefore a link is formed therebetween, despite the fact that the value 7 occurs more than once within the final line list.

Operation 5 of FIG. 16 attempts to link the entries above and below any previously created link regardless of uniqueness. Preferably, if the adjacent set of entries above is already linked, then operation 5 attempts to link the set of entries adjacent below the present link. An example of operation 5 is illustrated in FIG. 17B, wherein beginning with the second link between the third entries having hash values of 1, the adjacent pair of entries below are matching entries and accordingly a link is made therebetween by operation 5. Similarly, for the last set of entries having a hash value of 7, the adjacent set of entries above are matching entries and a link is created therebetween by operation 5, in one example.

Referring again to FIG. 16, operation 6 then eliminates the sections previously defined in both the draft and final line lists. Operation 7 then recalculates the sections in order to include a plurality of sections wherein a section is formed for each consecutively linked set of entries, or a section is formed for each consecutively non-linked set of entries. One example of operations 6–7 is shown in FIG. 17C wherein a section $S_1$ is created between the first pair of linked entries, a section $S_2$ is created for the next pair of non-linked entries, a section $S_3$ is created to include the next two pairs of linked entries since they are consecutive, a section $S_4$ is created to include the next set of non-linked entries (shown as entries having a hash value of 7, and assumed at this time to be non-linked as shown in FIG. 17B), and a section $S_5$ to include the final two pairs of linked entries.

Operation 8 of FIG. 16 performs operations 2–5 on each non-linked section only, wherein a match is considered unique when evaluated within a particular section as created by operation 7. One example of operation 8 is illustrated into FIG. 17C, wherein the non-linked section includes section $S_2$ and section $S_4$. A link cannot be made in section $S_2$ since the hash values of the entries between the line list do not match in section $S_2$. In section $S_4$, the entries have matching hash values (shown as 7) and these hash values are unique within section $S_4$, therefore operation 8 creates a link therebetween. Since there are no more non-linked sections, operation 8 is complete. Operation 9 of FIG. 16 loops to operation 6 until no further links are made within any non-linked sections.

Operation 10 then links corresponding entries from the word lists of both the draft and final transcripts based on any link made between entries of the respective line list. In one example, operation 10 can be performed as each link is made. Because a link between lines indicates equality therebetween, the words of these lines will also be linked. Operation 11 performs operations 1–9 of FIG. 16 as applied to the draft word list and the final word list in order to define sections within the word lists, and match entries therein. One example of operation 10–11 of FIG. 16 is illustrated in FIG. 17D, wherein the word list entries corresponding to the first set of linked line lists entries are matched to the extent that the word list entries have identical hash values and meet the criteria of operation 11 of FIG. 16 (which includes the criteria of operations 1–9 of FIG. 16).

Having completed the links between the line entries and the word entries of the lists for the draft and final transcripts, operation 12 queries the user as to whether the draft and final transcript files are in fact related based upon one or more metrics. Preferably, if the percentage of linked entries between the draft and final word lists is less than 60%, then the user is queried as to whether the draft and final transcripts are in fact related files. It is understood that the particular percentage criteria used in operation 12 is a matter of choice dependent upon the particular implementation.

The following pseudo-code illustrates one embodiment of the logical operations of FIG. 16:

Definitions for this Example

List entry: A hash that corresponds to a line/word in a hash list.
Section: Consecutive list entries that are either linked or unlinked.
Linked entry: a line/word hash that matches another line/word hash.
Matched section: section that consists completely of linked entries.

Steps

For each transcript file: Create a hash list with each hash representing a line.
For each transcript file: Create a hash list with each hash representing a word.
When creating line hashes ignore white space characters.

Function1 (draftList, finalList)

Function1 is called twice; first with the hash lists of all the lines, then with the hash lists of all the words. When a line is linked it's words are also linked. When we call this function the second time all lines that matched have words that are linked.

Loop (until no more links are made)
   if (the first time)
      For each list make a section covering the entire list.
   else
      Build section lists for both files by traversing list entries and making a section for each set of adjacent entries that are unlinked and for each set of adjacent entries that are linked to a set of adjacent entries in the other file.
   end if
   call Function2
end loop Function2 (draftList, finalList)

For each unmatched section; for each entry in the section, if the hash appears only once in both lists make a link between them, they match. Upon linking all unique hashes for the section, also attempt to link the first and last entries of the section. Next, iterate through the section starting from a known linked entry and work both forwards and backwards through the section linking entries that are adjacent, have matching hashes, and are not already linked. Stop at the first unlinkable pair.

The links between the line lists and the word list of the draft and final transcripts are useful in determining whether the final transcript was likely derived from the draft transcript, as previously explained. Further, the links between the word lists created by the operations of FIG. 16 are also used, in accordance with one embodiment of the present invention, to transfer annotations associated with the draft electronic transcript to the corresponding final electronic transcript for use therewith.

After the draft and final transcripts have been compared, the annotations associated with the draft transcript can be relocated and associated with the final transcript, in accordance with one embodiment of the present invention. FIG. 18 illustrates one example of the logical operations for relocating an annotation from a draft transcript into a final transcript for use therewith. At operation 1, the start and end line positions of the annotation are located within the draft transcript. At operation 2, the word located at the start position of the annotation in the draft transcript is determined, and the word located at the end position of the annotation within the draft transcript is also located. At operation 3, the start word is matched to the corresponding word in the final transcript, while the end word is matched to the corresponding word in the final transcript. At operation 4, the annotations in the final transcript are set based upon the position of the start and end words therein. While this process is described with reference to the word at the start and end of an annotation, other words can also be used as a matter of choice for the particular implementation.

FIG. 19 illustrates an example of the logical operation for transferring annotations associated with the draft electronic transcript to the final electronic transcript, in accordance with one embodiment of the present invention. Examples of the operations of FIG. 19 are illustrated in FIGS. 20A–D. The operations of FIG. 19 are described with reference to a single annotation having a start position and an end position associated with a draft transcript. It is understood that a typical draft transcript may have many annotations associated therewith, and accordingly the operations shown in FIGS. 19–20 would be preferably be performed on all annotations in the draft transcript.

Figure 20A:
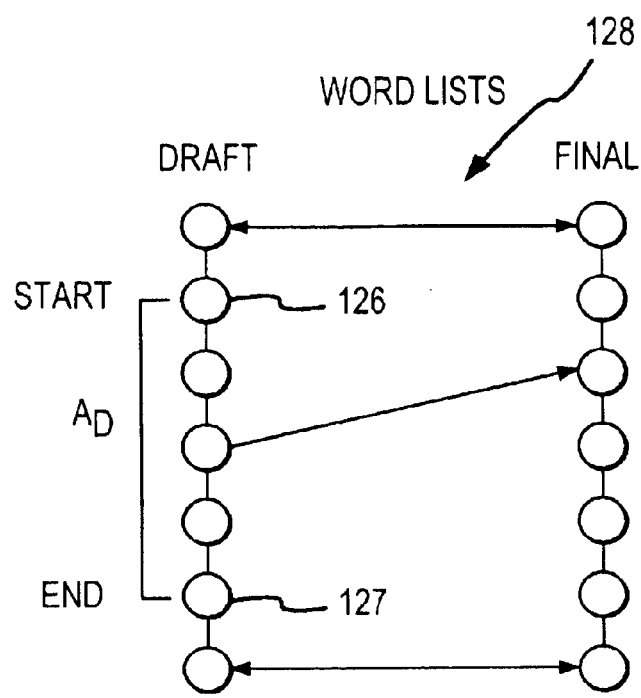
FIGS. 20A–D illustrate an example of word lists for a draft and final transcript having links there between, and how the operations of FIGS. 18–19 are performed thereon, in accordance with one embodiment of the present invention.

In FIG. 20A, the example annotation AD has a start position and end position within the word list of a draft transcript. FIG. 20A also illustrates an example of the links made between entries of the word lists by the operations of FIG. 16. It is noted that the example shown in FIGS. 20–D is a new and different example than the example shown in FIGS. 17A–D.

Figure 20B:
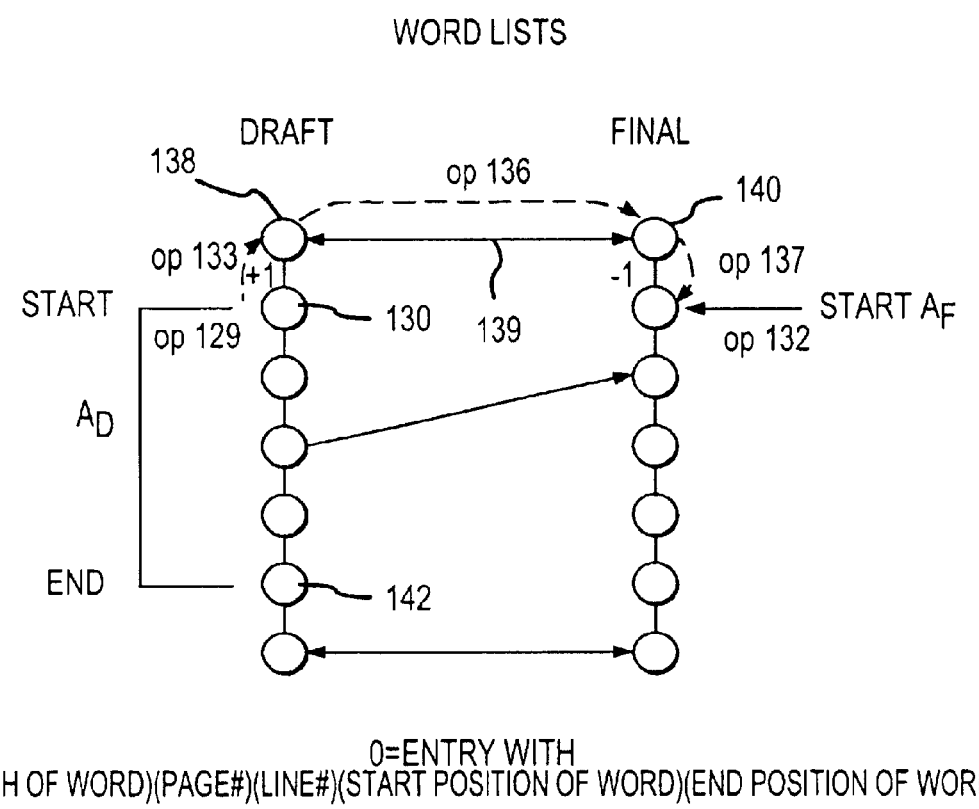

Referring now to FIG. 19, operation 21 locates the start position of the annotation within the draft transcript. One example of operation 21 is illustrated in FIG. 20B wherein the start position of the annotation is at the location of the second entry within the word list of the draft transcript. Operation 22 of FIG. 19 determines if the word entry at the start position of the annotation has a link to an entry in the word list of the final transcript. If so, operation 22 follows the link to the corresponding word in the final word list. Control is then passed to operation 28, described below.

If the entry at the start position of the annotation in the draft word list is not linked, then operation 23 preferably moves up by one or more entries from the start position in the draft word list to find an entry that has a link associated therewith. If no link was found by traversing upwardly until the start of the transcript, operation 24 repeats operation 23 in the opposite direction until a link is found. In this manner, in the event that text was added to the final transcript at the front of an annotation, operation 23 increases the likelihood that the annotation in the final transcript will include the appropriate text. Operation 25 counts the number of entries moved until a link was found, as well as the direction in which the movement was made (upward/downward).

Operation 26 follows the link found in the draft word list to the corresponding entry in the final word list. Operation 27 travels the reverse distance from the linked entry (or until another link is reached or until the end of the transcript is reached) in the final word list, and control is passed to operation 28. In this manner, operation 27 generally accounts for missing text or deleted words of the final transcript.

Operation 28 sets the current position in the final word list as the start position for the annotation within the final word list. Since each entry within the word list has the page and line number indicating where the word occurred within the final transcript, as well as the start position of the word as measured from the left side of the final transcript and the end position of the word as measured from the right most position of the final transcript, this data is used in locating the starting location of the annotation within the final transcript. Preferably, the page number, line number and starting position of the word in the final word list is used to locate the starting position of the annotation.

Referring to FIG. 20B, one example of the logical operations of FIG. 19 is shown. Beginning with operation 21, the starting position of the annotation is associated with the second entry in the draft word list. Since this entry does not have a link associated with it as determined by operation 22, control is passed to operation 23 which increments the present position upwardly to the first entry in the word list in this example. Since the top entry in the draft word list has a link associated with it as determined by operation 24, control is passed to operation 25 wherein the number of entries moved in order to find a link was one and the direction was upward. Operation 26 then follows the link associated with the top entry in the draft word list to the associated entry in the final word list, which happens to be the top entry in the final word list in this example. Operation 27 then travels the reverse distance (in this example, one position downward) in order to reach the proper position with the final word list. Operation 28 sets this position as the starting point for the annotation in the final word list, preferably using the page number, line number and starting position of the word in the final word list as indicated within the entry to which operation 28 points.

Referring again to FIG. 19, operation 28 then passes control to operation 29 in order to set the end position of the annotation within the final transcript. Operation 29 repeats operations 21–28 beginning at the end position of the annotation in the draft transcript, with these operations generally moving in opposite directions than the directions indicated in operations 21–27 to set the end position of the annotation, preferably. In one example the page number, line, and end position of the word as indicated in the entry of the final word list is preferably used to set the end position of the annotation within the final word list.

Figure 20C:
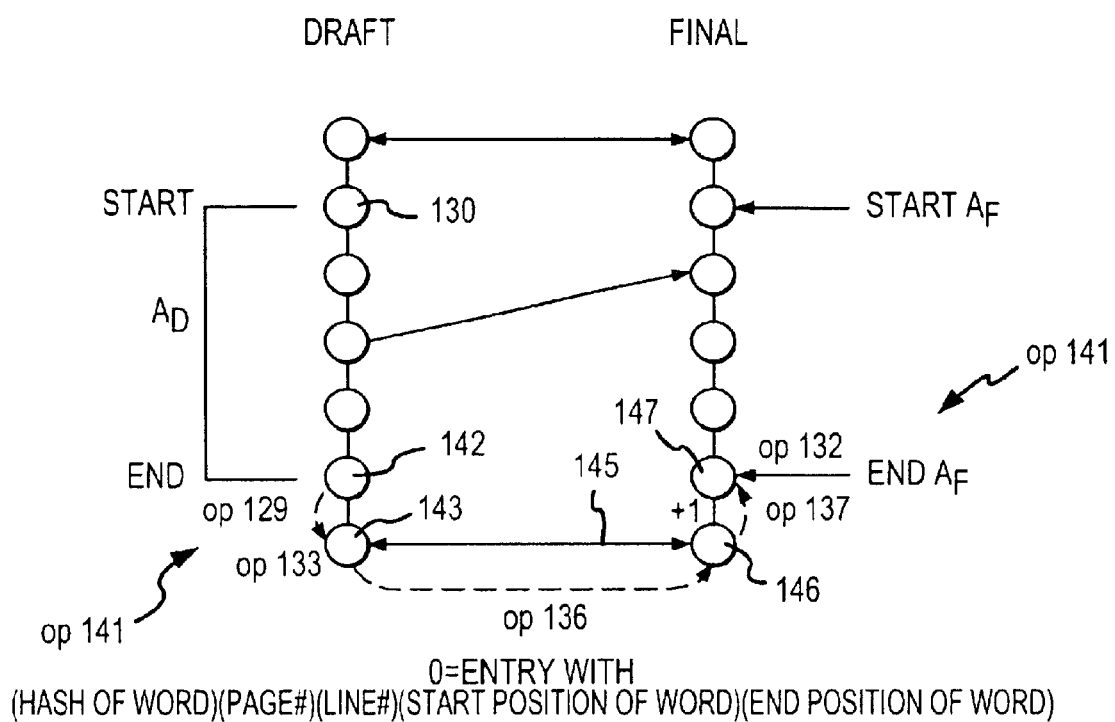

FIG. 20C illustrates an example of operation 29 for setting the end position of the annotation in the final transcript. Since operation 29 repeats steps 21–28 as adapted for positioning the end of the annotation within the final transcript, FIG. 20C will be described with reference to steps 21–28. Operation 21 locates the end position of the annotation with the draft transcript, and is shown in FIG. 20C as being the second to last entry within the word list of the draft transcript. Since this entry does not have a link associated therewith as determined by operation 22, control is passed to operation 23 which travels downwardly by one entry from the end position to the next entry down in the word list. Operation 24 determines that a link is found at the present entry, and operation 25 counts the number of entries moved as being one and the direction as being downward when an entry was found having a link associated therewith. Operation 26 then follows the link from the entry in the draft word list to the corresponding linked entry in the final word list. Operation 27 then travels a reverse direction in an equal amount from the linked entry, and in this example, upwardly by one position. Operation 28 then sets this position as the end position for the annotation within the final transcript. Preferably, the end position of the annotation within the final transcript is determined using the page number, line number, and end position of the word as indicated within the entry pointed to by operation 28.

Figure 20D:
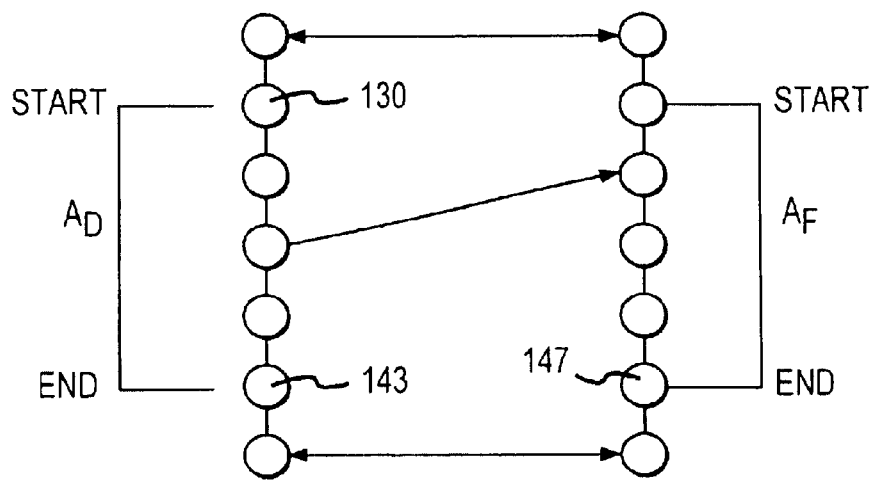

Accordingly, having performed operations 21–29 of FIG. 19 using the starting and ending positions of the annotation in the draft transcript, a corresponding annotation in the final transcript is positioned at the proper locations, as illustrated in FIG. 20D, in accordance with one embodiment of the present invention.

The following pseudo-code illustrates one example of the operations illustrated in FIG. 19:

For each annotation associated with the draft transcript; Find the first and last draft lines (hashed entries) that belong to the annotation's start and end points. From these lines find the draft words (hash entries) for the start and end of the annotation. If the annotation does not start or end on a word the closest word is used. In the event of a tie the start position uses the right word and the end position uses the left word.

For each draft word; attempt to obtain the corresponding final word:

The first (simple) case is that the draft word exactly matches a word in the final transcript. (i.e. The draft word is linked to a final word)

The second case is that the word was deleted/modified in the final version. If so get the closest linked draft word next to our draft word. In the case of the starting position word we look to the left first and then to the right, in the case of the end position the search is opposite. From the closest linked draft word get the corresponding final word. From there walk back down the final list the same number of words that we are away (distance from draft to draft word) until either we are at the last word in the transcript or the next word is linked. At that point we have our corresponding final word. Finally, set the annotations start and end points to the new points calculated above, taking into account if the start and end points have flipped (i.e., if the start is now the end)

Further, in accordance with embodiments of the present invention, a method for analyzing the structure of an electronic transcript is also disclosed herein. This method permits the determination of structural elements of a transcript so that, for example, a hyperlinked table of contents can be displayed to the user within the display pane as shown in FIGS. 7–9. In one example, the structural elements include, but are not limited to, pointers to the page where the appearances are listed (i.e., where the transcript identifies the names of the people and parties taking part in the proceeding), pointers to an exhibit index, pointers to the start of the proceedings, pointers to the beginning of a witness' testimony, pointers to the beginning of direct examination of a witness, pointers to the beginning of cross-examination of a witness, etc.

The method described herein can be used for detecting the structural elements of a transcript which is a draft transcript, a final transcript embodied in a file, or a real-time transcript file containing real-time transcript data. The method can also be applied dynamically and on-the-fly to streaming real-time transcript data as it is received by a computing system having the transcript management software operating thereon.

FIG. 21 illustrates the logical operations for analyzing the structural elements of an electronic transcript, in accordance with on embodiment of the present invention. At operation 1, transcript data is received for processing. As mentioned above, the transcript data can be in the form of a draft of final electronic transcript in a file, or transcript data received from a real-time feed. The operations of FIG. 21 can operate, for example, on transcript files of ASCII format, AMICUS (TM) format, page image format, electronic transcript format as an executable or PTX format, a LIVE NOTE (TM) PTF format, XML format, or the like.

Upon receiving the transcript data, operations 2–5 process the transcript data as will be described in greater detail below. In general, operation 2 divides the received transcript data into lexical units. Examples of lexical units include simple words, abbreviations that include periods, numerical values with or without commas, monetary values, dates expressed as slash separated numbers, and many others.

Operation 3 divides the received transcript data into actual body text and transcript layout data. The transcript layout data includes, for example, line numbers, page numbers and headers and footers.

Operation 4 assigns properties to each line of the actual body text. Examples of properties assigned to the lines of actual body text include whether the line is likely to be centered, whether the line contains space-separated text that is likely to be a heading (e.g. I N D E X); whether the line is entirely in uppercase; whether the line possibly indicates that a new speaker has started; whether the current speaker is an attorney, the court, or a witness; the name of the speaker; and many others.

Operation 5 categorizes each line of the transcript and assigns a structural description thereto. In one example, an engine is used that contains expert knowledge of possible transcript layouts, and uses the information from previous steps to apply heuristics to each line in turn to determine whether the line of the transcript falls into one of several categories that a user may be interested in. The categories for lines include, for example, headings, start of witness, start of examination (including type of examination and by whom), exhibit reference, and others.

The operations of FIG. 21 will now be described in greater detail. With reference to operation 2, operation 2 divides the received transcript data into a sequence of lexical units. Examples of lexical units include simple words, abbreviations that include periods, numerical values with or without commas, monetary values, dates expressed as slash separated numbers, and many others. Preferably, operation 2 is performed early in the structural analysis process so that the subsequent steps have detailed information about the transcript which can be used without repeated re-classification of the transcript data, which is useful for operations in real-time.

Space characters (' '), tabs ('\t'), line feeds ('\n'), carriage returns ('\r'), end of file markers ('0x1a' and '\0'), and page breaks ('\f') are the only characters guaranteed to separate lexical units or tokens (the values given in parentheses are the C language value of these characters). Many other characters may separate or may be part of a token. For example, a period "." may appear as part of an abbreviation (such as "etc.") or may end a sentence.

Preferably, the lexical units can include a type field, a subtype field, and a content field. Further, each lexical unit has a trailer which points to the next lexical unit in the sequence. The content field includes the content from the transcript data. The type field and the sub-type field describe the type of lexical unit, and preferably can include the following:

Integer: A whole number. Such as 17 or 37,000.

Real: A number followed by a period and additional numbers. Such as 2.45 or 45,567.45

Phone Number: A number containing hyphens. E.g. 345-234-2345

Ordinal: One or more digits followed by either st, nd, th, rd, or d. E.g. 31st. 193rd.

Time: A time in the format HH:MM:SS followed by either AM or PM. For example 4:27 PM, or 09:10:55.

Date: A slash separated date. For example 5/1999 or Apr. 19, 2000.

Currency: An Integer or Real immediately preceded by a dollar sign. E.g. $17 or $1,234.45

HashNumber: An Integer immediately preceded by a pound sign. E.g. #123

Abbreviation: Any sequence of letters and periods beginning with a letter that contains at least four characters total.

Preferably, most end of sentence words are treated as abbreviations.

Initial: A single letter followed by a period.

Word: Any sequence of letters that may contain apostrophes, or end in an 's' followed by an apostrophe.

AlphaNum: Any sequence of letters, numerals, apostrophes and hyphens.

Punctuation: Classified into several sub-types, they are:

Phrase separators: Comma, semi-colon or colon.

End of sentence: Period, exclamation mark, or question mark.

Open group: Left parenthesis or left square bracket.

Close group: Right parenthesis or right square bracket.

Quote: Double quote, Single quote or Back-quote.

Pause: Slash (forward or backward), isolated hyphen, or three periods (an ellipsis).

Formatting: Two sub-types:

End-of-line: Any single carriage return or line feed, or pair thereof.

End-of-file: The '0x1a' or '\0' characters.

Whitespace: Each tab character is converted to five spaces that are also combined with any adjacent spaces. Any sequence of spaces is treated as a single token.

Misc: Any sequence of characters that is not classified into one of the above categories is treated as a miscellaneous token. This includes any sequence wholly containing the following characters _@#$%^&*+-=}{|~.

The process of breaking the received transcript data down into lexical units preferably takes place on a line-by-line basis. For any given chunk of raw transcript text, the result of this process yields a structure similar to that shown in FIGS. 22A–B. FIG. 22A shows an example of original transcript data having a page break character, a page number, a text section identifying the "direct examination", text of the questions and answers transcribed, and line numbers corresponding thereto.

FIG. 22B shows an example of how the original transcript data from FIG. 22A is processed into various lexical units. As shown in FIG. 22B, preferably a line index is maintained, and for each line index, a type field, a subtype field, and a content field is maintained for arranging the transcript data into its various lexical units, as described above.

This resulting lexical units created by operation 2 are used during later operations within the process, such as operations 3–5 of FIG. 21.

With reference to operation 3 of FIG. 21, operation 3 divides the received transcript data into actual body text and transcript layout data. The transcript layout data includes, for example, line numbers, page numbers and headers and footers.

Operation 3 operates on ASCII transcripts in page image format and transcripts in other formats.

The layout of a typical ASCII transcript page can be broken down into discrete sections, as follows: 1) header and footer [optional]; 2) left margin [may be zero]; 3) line numbers [optional]; 4) text leader; 5) line text; and 6) page break to separate from next page [optional].

FIG. 23 shows an example of the start of a typical page image ASCII transcript page. In FIG. 23, the header, line text, line numbers and page number are labeled. The left margin is the space to the left of the line numbers, and the text leader is the space between the line numbers and the line text.

The process of taking a page image ASCII file and normalizing it into these component elements is adapted to handle many different transcript formats. Many elements are optional, or due to limitations in the software that generates the transcript file, are simply not present. This normalization of the transcript text works with the pre-parsed transcript (i.e. after it has been broken down into lexical units by operation 2). This ensures that the normalization occurs as quickly as possible.

The normalization phase of operation 3 preferably characterizes each line as:

Whether it is line numbered.

Whether it contains a page number.

Whether it is a header or footer line.

The index of the first lexical unit that is actual transcript text (if any). [Note that header and footer lines are preferably not treated as part of the transcript text.]

The total number of lexical units it contains.

The width of the actual transcript text, in characters.

The width of the leader text for the line, in characters.

Whether the line is in between numbered lines (title and index pages often have unnumbered lines between the numbered lines that are part of the transcript text).

The width of the leader on each page. Note that some lines may be indented further in addition to the leader.

With respect to operation 4 of FIG. 21, operation 4 assigns properties to each line of the actual body text. Examples of properties assigned to the lines of actual body text include whether the line is likely to be centered, whether the line contains space-separated text that is likely to be a heading (e.g. I N D E X); whether the line is entirely in uppercase; whether the line possibly indicates that a new speaker has started; whether the current speaker is an attorney, the court, or a witness; the name of the speaker; and many others. Various properties are assigned to the lines, such as:

Whether it is written as expanded text (e.g. E X H I B I T I N D E X)

The number of terms of more than a single space in length.

Whether the line is all upper case.

Whether the line starts with an all upper case word.

The position of the first word on the line that is not all upper case.

Whether the line begins with an open parenthesis.

Whether the line ends with a close parenthesis.

Whether the line ends with a colon.

Whether the line ends in an integer.

Whether the line ends in a period.

The position of the word "BY" word in the line.

The position of the first colon in the line.

The position of the first comma in the line.

The position of the first open paren in the line.

The position of the first close paren in the line.

The position of the first "EXAMINATION" word in the line.

The position of first "DEPOSITION" word in the line.

Whether the line is centered (fuzzy calculation).

Whether the line is probably inside a parenthetical (fuzzy calculation).

Whether the line consists of spoken text.

The type of speech this line is part of: None, Court, Answer, Question, Attorney, or Witness.

A determination is made whether the line is expanded. By looping through the terms in a line, it can be seen whether the line consists of single letters that are separated by spaces (and words that are separated by three or more spaces). If it does, then the actual non-expanded text of the line is calculated and carried around with the line data, and preferably a "Line is expanded" flag is set.

A determination is made whether the line is centered. This is an indication that the line is probably centered, and is treated as such when computing the actual structure. Whether the line is to be considered centered is computed as follows:

1. Compute the amount of space on the left of the text, by taking the first whitespace token and subtracting the width (in characters) of the left leader.
2. Do a check on the left indent. If the left indent is less than 6 or more than 33 (for example), then the line is never be marked as centered.
3. Compute the amount of space on the right of the text, by subtracting the width of the line (including the space on the left) from the actual width, in characters, of the transcript page. The page width is assumed to be the maximum width of the transcript text lines on the current page (i.e. not including margin, line number, or text leader).
4. Compute the absolute value of the difference between the amount of space on the right, and the amount of space on the left.
5. If this difference is less than one-third of the size of the left indent, then set a Centered flag to True. Otherwise the centered flag is set to False.

A determination is made whether the line is within a parenthetical. A parenthetical is an aside inserted by a court reporter into the transcript text when some non spoken action takes place, or when a summary of an action is required. For example, "(The jury entered the court-room)". These parentheticals may span lines, and text within them is not treated as spoken text, or as a potential heading.

To determine if a line is within a parenthetical:

1. If the line begins and ends with a parenthesis then it is marked as being in a parenthetical.
2. If we started a line with an open parenthesis less than 7 lines ago, for which there has been no matching close parenthesis, then mark this line as within a parenthetical.

Preferably, only 7 full lines are permitted for a parenthetical to prevent unmatching parentheses from causing an entire transcript to be ignored for structure.

With respect to operation 5 of FIG. 21, operation 5 categorizes each line of the transcript and assigns a structural description thereto. In one example, an engine is used that contains expert knowledge of possible transcript layouts, and uses the information from previous steps to apply heuristics to each line in turn to determine whether the line of the transcript falls into one of several categories that a user may be interested in. The categories for lines include, for example, headings, start of witness, start of examination (including type of examination and by whom), exhibit reference, and others.

As a result of the line properties gathered during the previous phase, the structure of the transcript can be extracted. The following four structural entries are detected during operation 5:

1. Speaker names.
2. Headings (e.g. Exhibit Index).
3. Start of witness testimony
4. Witness sections (e.g. Cross-examination).

The additional properties that are gathered to identify this structure are as follows:

Whether the line contains a speaker name.
The name of the speaker name this line contains (if any e.g. Mr. Smith).
Whether the line is a heading
The name of the heading this line contains (if any, e.g. Exhibit Index).
Whether this line contains a witness section term (i.e. a term that indicates that a new examination, cross-examination etc. is starting).
Whether this line begins a new witness section.
The name of the witness section. (E.g. Direct Examination)
The name of the person examining the witness (e.g. Mr. Smith)
Whether this line contains a witness name term (i.e. a term that indicates a new witness is or will be starting).
Whether this line possibly contains a witness name.
The name of the witness.
Whether the possible witness name has been confirmed as a witness name.

The process of determining these properties is as follows:

Determine if a line matches the list of "inclusions" for the structure entry type. E.g. If it is centered, expanded or all uppercase it is further processed to see if it is actually a heading.
Filter out those lines that match any set of properties in the exclusion list for structure entries of the matching type. E.g., if it does not contain one of the words that are required in headings, then it is not treated as a heading.

Developing the list of inclusions and exclusions for each structure entry type is the main detail in this section. Doing so relies on iterative testing of many sample transcripts. In each iteration, an expert identifies the reasons for noise matches, and adds "exclusions" to each structure entry type within the engine to prevent those matches from occurring again. In doing so, it is important to be careful to not exclude legitimate matches, and additional "inclusion" rules may be needed to ensure that appropriate lines are passed through the exclusion filter.

Figure 24:
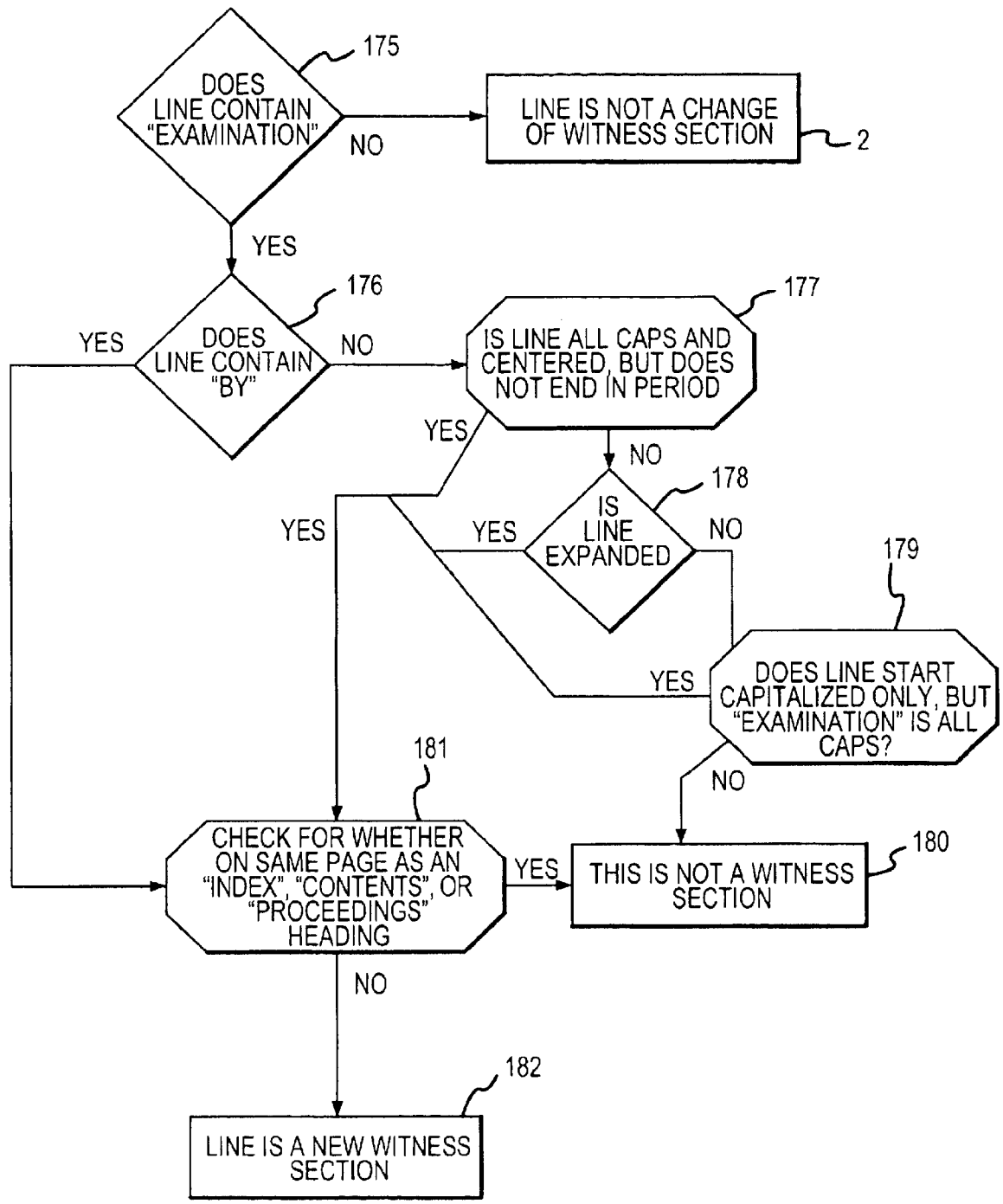
FIG. 24 illustrates one example of logical operations for analyzing the structural components of a transcript, in accordance with one embodiment of the present invention.

An example method of determining whether a line is a new witness section (Examination, Cross-Examination etc.) is shown in FIG. 24. Similar methods can be employed for each type of structure entry. Referring to FIG. 24, at operation 1 the line is examined for example to determine whether it contains the word "EXAMINATION." If not, then control is passed to operation 2 and the line is not a change of witness section.

If the line does contain "EXAMINATION" as determined by operation 1, then decision operation 3 determines if the line contains the word "BY." If not, control is passed to operation 4 which tests whether the line contains all caps and centered text but does not end in a period. If no, decision operation 5 determines if the line is expanded, and if not, decision operation 6 determines whether the line starts capitalized only, but "EXAMINATION" is in all caps. If not, then control is passed to operation 7 as this is not a witness section. If either decision operations 3, 4, 5 or 6, result in a yes, then control is passed to operation 8 which determines whether the line is on the same page as a heading such as "Index," "Contents," or "Proceedings." If so, control is passed to operation 7, as this is not a witness section. Otherwise, decision operation 8 passes control to operation 9 as the line is a new witness section.

From the operations of FIGS. 21–24, the analysis of the structural components of a transcript can be used for a variety of purposes, including for example, creating a table of contents having hyper-links thereto showing the user the desired structural sections, as discussed above.

Embodiments of the present invention can be embodied in a computer program product. It will be understood that the computer program product of the present invention preferably is created in a computer usable medium, having computer readable code embodied therein. The computer usable medium preferably contains a number of computer readable program code devices configured to cause a computer to affect the various functions required to carry out the invention, as herein described.

The embodiments of the invention described herein are implemented as logical operations in a computing system. The logical operations of the present invention are implemented (1) as a sequence of computing implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

While the methods disclosed herein has been described and shown with reference to particular steps or operations performed in a particular order, it will be understood that these steps or operations may be combined, sub-divided, or re-ordered to form an equivalent method without departing from the teachings of the present invention. Accordingly, unless specifically indicated herein, the order and grouping of the steps is not a limitation of the present invention.

The foregoing embodiments and examples are to be considered illustrative, rather than restrictive of the invention, and those modifications, which come within the meaning and range of equivalence of the claims, are to be included therein. While the invention has been particularly shown and described with reference to a preferred embodiment thereof, it will be understood by those skilled in the art that various other changes in the form and details may be made without departing from the spirit and scope of the invention.

We claim:

1. A method for transferring annotations associated with a draft electronic transcript having a word/line content to a revised electronic transcript having a word/line content, comprising:

receiving a draft electronic transcript;

receiving a revised electronic transcript;

determining from the word/line content of the revised electronic transcript and from the word/line content of the draft electronic transcript if the revised electronic transcript is derived from the draft electronic transcript and where within the revised electronic transcript the annotations are to be located;

if so, creating annotations to the revised electronic transcript based on the annotations associated with the draft electronic transcript;

storing the revised electronic transcript and its created annotations; and wherein the determining step includes the steps of:

forming a word-list for the draft electronic transcript having entries associated with each word in the draft electronic transcript, the entries including a hash for each word, a page number for each word, a line number for each word, a start position for each word, and an end position for each word;

forming a line-list for the draft electronic transcript having entries associated with each line in the draft electronic transcript, the entries including a hash for each line, a page number for each line, and a line number for each line;

forming a word-list for the revised electronic transcript having entries associated with each word in the revised electronic transcript, the entries including a hash for each word, a page number for each word, a line number for each word, a start position for each word, and an end position for each word;

forming a line-list for the revised electronic transcript having entries associated with each line in the revised electronic transcript, the entries including a hash for each line, a page number for each line, and a line number for each line;

comparing entries within the line-list for the draft electronic transcript to entries within the line-list for the revised electronic transcript; and comparing entries within the word-list for of the draft electronic transcript to entries within the word-list for the revised electronic transcript.

2. The method of claim 1 including:

(a) provide a line-list for the draft electronic transcript, the line-list having a first entry and a last entry;

(b) provide a line-list for the revised electronic transcript, the line-list having a first entry and a last entry;

(c) define a section within the line-list for the draft electronic transcript that covers all entries therein;

(d) define a section within the line-list for the revised electronic transcript that covers all entries therein;

(e) search for each entry within the defined section of the line-list for the draft electronic transcript that uniquely matches an entry within the defined section of the revised electronic transcript;

(f) create a link between uniquely matched entries found in step (e);

(g) form a link between the first entry in the line-list for the draft electronic transcript and the first entry in the line list for the revised electronic transcript if these first entries match;

(h) form a link between the last entry in the line-list for the draft electronic transcript and the last entry in the line list for the revised electronic transcript if these last entries match;

(i) search both above and below previously created links for entries within the defined section of the line-list for the draft electronic transcript that match entries within the defined section of the line-list for the revised electronic transcript;

(j) create a link between matching entries found in step (i);

(k) eliminate the defined sections of the line-list for the draft electronic transcript and of the line-list for the revised electronic transcript;

(l) define each pair of linked entries, or set of consecutively linked entries, as a linked-section;

(m) define each pair of non-linked entries, or set of consecutive non-linked entries, as a non-linked-section;

(n) search for uniquely matching entries within the non-linked sections;

(o) create a link between each uniquely matched pair of entries found in step (n);

(p) search for matching entries between the first and last entries within each non-linked section;

(q) create a link between each matching pair of entries found in step (p);

(r) create a link between matching pairs of entries located above and below the links previously created by steps (l)–(q); and (s) for any link created in the above steps (a) thru (s), repeat above steps (a) thru (s) as applied to a word-list for the draft electronic transcript and a word-list for the revised electronic transcript in order to define sections within the word lists and matching entries in the word lists.

3. A method for transferring annotations associated with a draft electronic transcript having a word/line content to a revised electronic transcript having a word/line content, comprising:

receiving a draft electronic transcript in real-time;

receiving a revised electronic transcript;

determining from the word/line content of the revised electronic transcript and from the word/line content of the draft electronic transcript if the revised electronic transcript is derived from the draft electronic transcript and where within the revised electronic transcript the annotations are to be located;

if so, creating annotations to the revised electronic transcript based on the annotations associated with the draft electronic transcript; and storing the revised electronic transcript and its created annotations.

4. A method for transferring annotations associated with a draft electronic transcript having a word/line content to a revised electronic transcript having a word/line content, comprising:

receiving a draft electronic transcript;

receiving a revised electronic transcript in real-time;

determining from the word/line content of the revised electronic transcript and from the word/line content of the draft electronic transcript if the revised electronic transcript is derived from the draft electronic transcript and where within the revised electronic transcript the annotations are to be located;

if so, creating annotations to the revised electronic transcript based on the annotations associated with the draft electronic transcript; and storing the revised electronic transcript and its created annotations.

5. A method for relocating an annotation from a draft electronic transcript to a revised electronic transcript, comprising:

locate a start-line position of the annotation within the draft transcript;

locate the end-line position of the annotation within the draft transcription;

determine a start-word that is at the start-line position of the annotation within the draft transcript;

determine an end-word that is at the end-line position of the annotation within the draft transcript;

match the start-word to a corresponding start-word within the revised transcript and determine the position of the corresponding start-word;

match the end-word to a corresponding end-word within the revised transcript and determine the position of the corresponding end-word;

relocate the annotation from the draft transcript to a position within the revised transcript that is defined by the position of the corresponding start-word and corresponding end-word;

(a) form a word-list for the draft transcript having entries associated with each word within the draft transcript;

(b) form a word-list for the revised transcript having entries associated with each word in the revised transcript;

(c) determine if the start-word within the word-list for the draft transcript has a link to a word within the word-list for the revised transcript;

(d) if a link is determined by step (c) skip to step (i);

(e) if a link is not determined by step (c), go up one or more words from the start-word in the word-list for the draft transcript to find a link between a word in the word-list for draft transcript and a word in the word-list for the revised transcript, and if no link is then found, go down one or more words from the start-word in the word-list for the draft transcript to find a link between a word in the word-list for draft transcript entries and a word in the word-list for the revised transcript;

(f) count the number of words and the direction traveled until a link was found in step (e);

(g) follow any link found from the draft transcript word to the revised transcript word in the revised transcript word-list;

(h) travel a number of entries equal to the number of entries counted in step (f) in a direction opposite to the direction in step (e) within the revised word-list;

(i) set a position in the last step performed as a starting position for the annotation in the revised word-list; and (j) repeat steps (a) thru (i) using reverse directions to locate an end position for the annotation in the revised word-list.

6. A method for analyzing the structure of an electronic transcript, comprising:

receiving electronic transcript data;

dividing the transcript data into lexical units;

dividing the transcript data into transcript layout data, and into actual body text having words and one or more lines;

assigning properties to each line of the actual body text; and categorizing each line of the actual body text by assigning a structural description to each line;

wherein the categorizing step includes the step of;

applying heuristics to each line of the actual body text to determine wherein a structural description of each line falls into one of several known categories.

7. The method of claim 6 wherein:

the structural description of each line is a Speaker's Name, a Heading, the Start of Witness Testimony, or a Witness Section.

8. A method for analyzing the structure of an electronic transcript, comprising:

receiving electronic transcript data;

dividing the transcript data into lexical units;

dividing the transcript data into transcript layout data, and into actual body text having words and one or more lines;

assigning properties to each line of the actual body text; and categorizing each line of the actual body text by assigning a structural description to each line;

wherein the lexical units are simple words, abbreviations that include periods, numerical values with or without commas, monetary values, or dates expressed as slash-separated numbers.

9. A method for analyzing the structure of an electronic transcript, comprising:

receiving electronic transcript data;

dividing the transcript data into lexical units;

dividing the transcript data into transcript layout data, and into actual body text having words and one or more lines;

assigning properties to each line of the actual body text; and categorizing each line of the actual body text by assigning a structural description to each line;

wherein the transcript layout data are line numbers, page numbers, headers, or footers.

10. A method for analyzing the structure of an electronic transcript, comprising:

receiving electronic transcript data;

dividing the transcript data into lexical units;

dividing the transcript data into transcript layout data, and into actual body text having words and one or more lines;

assigning properties to each line of the actual body text; and categorizing each line of the actual body text by assigning a structural description to each line; wherein;

the assigned properties are selected from a group consisting of whether the actual body text is written as expanded text, whether a number of terms in the actual body text are more than a single space in length, whether a line is all upper case, whether a line starts with an all upper case word, whether a position of a first word in a line is not all upper case, whether a line begins with an open-parenthesis, whether a line ends with a close-parenthesis, whether a line ends with a colon, whether a line ends with an integer, whether a line ends with a period, whether a position of the word "BY" in a line, the position of a first colon in a line, the position of a first comma in a line, the position of a first open parenthesis in a line, the position of the first close parenthesis in a line, the position of the first "EXAMINATION" word in a line, the position of the first "DEPOSITION" word in a line, whether a line is centered, whether a line is probably inside a parenthetical phrase, and whether a line consists of spoken text, and the type of speech of a line.

11. The method of claim 10 wherein:

the type of speech of a line is None, Court, Answer, Question, Attorney, or Witness.

* * * * *